United States Patent [19]

McGuinness

[11] Patent Number: 5,558,783

[45] Date of Patent: Sep. 24, 1996

[54] SUPERCRITICAL OXIDATION REACTOR

[76] Inventor: Thomas G. McGuinness, 2990 Middlebury Ct., West Aurora TL 60504

[21] Appl. No.: 377,420

[22] Filed: Jan. 24, 1995

Related U.S. Application Data

[63] Continuation-in-part of Ser. No. 14,345, Feb. 5, 1993, Pat. No. 5,384,051.

[51] Int. Cl.$^6$ .......................................... C02F 1/72
[52] U.S. Cl. ........................ 210/761; 210/765; 210/766; 210/769; 210/774; 210/180; 210/181; 210/182; 210/188; 210/195.1; 210/206; 422/184; 422/198; 422/208; 422/211; 422/232; 422/239; 422/241; 588/209; 588/213
[58] Field of Search .................... 210/761, 762, 210/765, 769, 787, 774, 143, 149, 180, 181, 195.1, 198.1, 205, 766, 206, 188, 182; 422/184, 198, 200, 204, 208, 211, 222, 232, 239, 241; 588/209, 216, 217, 228, 230, 241, 215

[56] References Cited

U.S. PATENT DOCUMENTS

| 2,062,358 | 12/1936 | Frolich | 134/60 |
|---|---|---|---|
| 3,519,396 | 7/1970 | Eagle et al. | 23/277 |
| 3,687,646 | 8/1972 | Brent et al. | 48/209 |
| 3,852,192 | 12/1974 | Fassell et al. | 210/63 |
| 4,208,373 | 6/1980 | Matovich | 422/129 |
| 4,229,296 | 10/1980 | Wheaton et al. | 210/758 |
| 4,292,953 | 10/1981 | Dickinson | 110/106 |
| 4,309,387 | 1/1982 | Carter | 422/201 |
| 4,338,199 | 7/1982 | Modell | 210/721 |
| 4,380,460 | 4/1983 | Otstot et al. | 55/158 |
| 4,380,960 | 4/1983 | Dickinson | 110/347 |
| 4,428,202 | 1/1984 | Carson | 60/648 |
| 4,543,190 | 9/1985 | Modell | 210/721 |
| 4,593,202 | 6/1986 | Dickinson | 290/54 |
| 4,792,408 | 12/1988 | Titmas | 210/747 |
| 4,793,919 | 12/1988 | McCorquodale | 210/177 |
| 4,822,497 | 4/1989 | Hong et al. | 210/721 |
| 4,861,497 | 8/1989 | Welch et al. | 210/759 |
| 4,869,833 | 9/1989 | Binning et al. | 210/761 |
| 4,891,139 | 1/1990 | Zeigler et al. | 210/747 |
| 4,909,808 | 3/1990 | Voecks | 48/94 |
| 5,075,017 | 12/1991 | Hossain et al. | 210/761 |
| 5,219,270 | 6/1993 | Titmas | 415/80 |
| 5,384,051 | 1/1995 | McGinness | 210/761 |

FOREIGN PATENT DOCUMENTS

WO93/02969  2/1993  WIPO.

Primary Examiner—Peter A. Hruskoci
Attorney, Agent, or Firm—Jeffrey D. Myers

[57] ABSTRACT

The invention relates to an improved apparatus and method for initiating and sustaining an oxidation reaction. A fuel, such as natural gas or hazardous waste, is introduced into a reaction zone within a pressurized containment vessel. A permeable liner is placed within the containment vessel and around the reaction zone. An oxidizer, preferably oxygen, is mixed with a carrier fluid, such as water, and the mixture is heated and pressurized to supercritical conditions of temperature and pressure. The supercritical oxidizer-carrier mix is introduced to the reaction zone gradually and uniformly, over a comparatively large area, by forcing it radially inward through the permeable liner and toward the reaction zone. A means and method for cooling the exhausted by-products and using them as a cleansing rinse are disclosed.

16 Claims, 9 Drawing Sheets

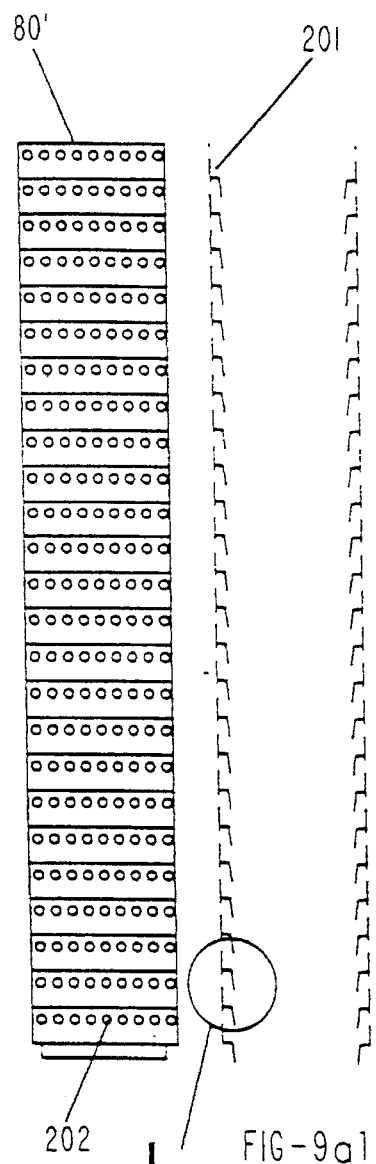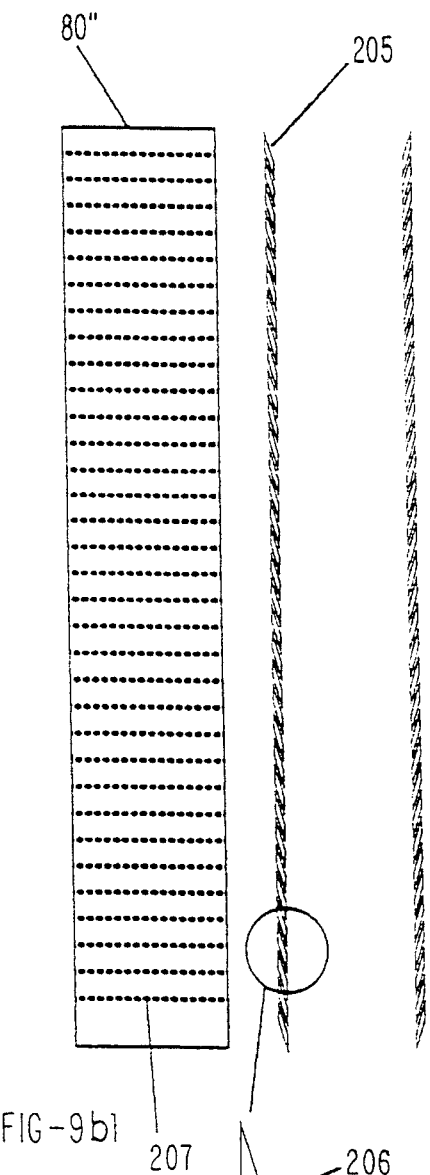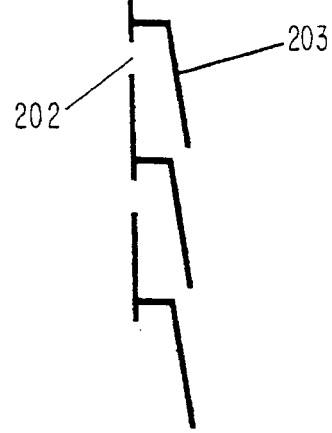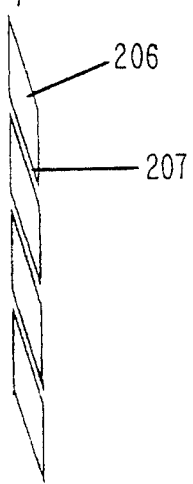
FIG-9a1   FIG-9b1
FIG-9a2   FIG-9b2

SUPERCRITICAL OXIDATION REACTOR

CROSS-REFERENCE TO RELATED APPLICATIONS

This application is a continuation-in-part application of U.S. patent application Ser. No. 08/014,345, now U.S. Pat. No. 5,384,051 entitled "Supercritical Oxidation Reactor", to Thomas G. McGuinness, filed on Feb. 5, 1993, the teachings of which are incorporated herein by reference.

BACKGROUND OF THE INVENTION

1. Field of the Invention (Technical Field)

The invention relates to a reactor apparatus, and method for its use, utilizing water or other fluid at supercritical temperature and pressure to accelerate the oxidation of fuels and/or the breakdown of substances, particularly hazardous substances.

2. Background Art

Mankind's need to develop more efficient uses of non-renewable energy sources is well-documented and nearly universally recognized. Considerable attention has been directed toward solving the dual problems posed by the widespread inefficient combustion of hydrocarbon fuels: the limited quantity of remaining proven petroleum reserves, and the environmental degradation attributed to hydrocarbon combustion. Concerns about the depletion of non-renewable energy sources, coupled with the anticipated energy demands of the coming decades, demand the development of energy-efficient uses of fossil fuels. Moreover, and with increasing frequency, inefficient combustion of fossil fuels is blamed for the "greenhouse effect" and other adverse atmospheric impacts, as well as deleterious impacts upon human health.

Similarly, the need safely to dispose of hazardous wastes, especially toxic and carcinogenic by-products of manufacturing and research processes, has commanded substantial public and governmental attention in the past two decades. The federal and state governments have responded to public pressure by adopting various statutes and regulations requiring that hazardous wastes be managed and disposed of properly with minimized risk to the public and the environment. Probably the most comprehensive and detailed plan for requiring safe management and disposal of hazardous waste is the federal Resource Conservation and Recovery Act of 1976 ("RCRA"), 42 U.S.C. §§6901, et seq., as amended through 1990, and the regulations promulgated thereunder.

A vital portion of the federal RCRA regulations, comprising some 461 pages of material, are located at Title 40, Parts 260–270, of the Code of Federal Regulations, as amended through 1992. RCRA and its regulations include a detailed permitting process for managing hazardous wastes "from cradle to grave," and impose permitting and performance standards upon persons generating and transporting hazardous wastes, as well as facilities treating, storing, or disposing of hazardous waste. Performance and operating standards for frequently encountered methods and/or facilities for treating or disposing of hazardous waste (including incinerators) are found at Part 264 of Title 40 of the Code of Federal Regulations.

Despite continued efforts to accomplish safe hazardous waste disposal, a profound need remains for a means of disposing of hazardous waste that is completely thorough. Many existing modes of waste disposal (i.e. landfills, surface impoundments) simply move hazardous substances from one "high risk" biosphere to some other "low risk" biosphere perceived to be removed from potential exposure to humans. Many common disposal methods thus focus on isolating hazardous waste, rather than eliminating it. Alternatively, and with increasing frequency due to public pressure, hazardous waste is treated in an effort to eliminate or neutralize its hazardous characteristics. Treatments may be chemical or biochemical in nature, as in combustion or microbial biodegradation. Combustion, i.e. high-temperature incineration, once thought a preferred treatment of the future, is falling from public favor due to fears of incomplete combustion and resulting air pollution (especially $NO_x$ compounds) and high operational costs.

A promising solution to the above problems is posed by the burning of fuels and wastes using accelerated oxidation in specially devised reactors. Supercritical oxidation reactors use oxidizer mixtures, typically including water, at supercritical conditions to initiate a redox reaction with a fuel. The use of supercritical water in the oxidizer mix is desirable, as the supercritical state of the mix accelerates the reaction and boosts reaction efficiency, thus minimizing unreduced (and therefore still-harmful) exhaust.

In the typical example of the present art, the reaction takes place in an unlined cylindrical pressure vessel composed of high-grade steel or other expensive alloy capable of withstanding the temperature and corrosive effects of the reaction. The fuel and the supercritical oxidizer mix typically are externally heated and then introduced through a port at one end of the cylinder and immediately allowed to mix. The temperature of the fluids and the pressure within the vessel cause the resulting mix spontaneously to react. In the existing art, the reaction may be an uncontrolled detonation with reactor damage, due to the rich mixtures coming into rapid and complete contact within very short frames of time and space.

The reaction by-products typically are ejected from the opposite end of the pressure vessel, but not before substantial amounts of precipitates and scale have had an opportunity to accumulate upon the interior surfaces of the vessel. Existing reactors are frequently fouled with sufficient accumulates to impair reactor performance. Moreover, these reactor devices, being comprised of a simple single-walled chamber, are also inefficient sources of heat energy. Usually, the reaction is sustained by the addition of heat directly through the vessel walls; attempts to extract the heat of reaction through the same walls, therefore, is complicated at best.

U.S. Pat. No. 3,519,396 to Eagle, et al., entitled *Means for Injecting a Gaseous Reactant*, describes an apertured and chambered device for mixing gaseous reactants.

U.S. Pat. No. 3,852,192 to Fassell, et al., entitled *Reactor for Wet Oxidation of Organic Matter*, discloses a compartmentalized apparatus for performing wet oxidation of organic matter. Oxygen-containing gas is bubbled through an agitated aqueous medium to foster intimate association with the organic matter at reduced temperature.

U.S. Pat. No. 4,229,296 to Wheaton, et al., entitled *Wet Oxidation System Employing Phase Separating Reactor*, teaches a chambered device for accomplishing wet oxidation utilizing a gas phase/liquid phase separator feature.

U.S. Pat. No. 4,792,408 to Titmas, entitled *Method and Apparatus for Enhancing Chemical Reactions at Supercritical Conditions*, discloses a device for inducing chemical reactions at supercritical conditions; the very large apparatus does not incorporate any means for gradually or uniformly dispersing a reactant into the reaction chamber to enhance reactor performance.

U.S. Pat. No. 4,793,919 to McCorquodale entitled *Wet Oxidation System*, describes a system for accomplishing oxidation of organic matter in an aqueous medium under elevated temperatures and pressures.

U.S. Pat. No. 4,869,833 to Binning, et al., entitled *Method and Apparatus for Controlled Chemical Reactions*, teaches a system for effecting accelerated chemical reactions at elevated temperatures and pressures within a tubular reaction coil. Reactants may be introduced at various locations, but no permeable liners are disclosed.

SUMMARY OF THE INVENTION

(DISCLOSURE OF THE INVENTION)

The invention relates to an improved reactor apparatus and method for initiating and sustaining reactions, particularly chemical reactions, and most particularly oxidation reactions.

The invention finds preferable use in the field of supercritical reactor applications, wherein one or more reactants introduced into the reactor's reaction zone are heated and pressurized to a supercritical state, and/or are mixed with a non- or semi-reactant carrier fluid that has been elevated to a supercritical state. The supercritical condition of one or more reactants enhances intermolecular interaction and thus accelerates the reaction. The acceleration of the reaction improves the efficiency of the reactor and permits improvements in reactor design and cost.

In the preferred embodiment of the invention, the reactants are natural gas (methane) and oxygen, with supercritical water employed as a carrier fluid for the oxygen. The invention may satisfactorily perform in other applications, however. An alternative fuel may be hazardous waste, which is reduced or neutralized to harmless by-products by the redox reaction.

The preferred embodiment includes the use of a permeable liner surrounding the reaction zone contained within the reactor pressure vessel. The main function of the liner is to isolate the pressure vessel from the high temperatures and oxidizing conditions found in the reaction zone, allowing a reduction in cost of the pressure vessel. At least one reactant is introduced into the reaction zone via permeation through the liner, resulting in a wide spacial dispersion of the reactant (as opposed to discrete, point-source injection). The permeable liner permits the continuous, gradual, uniform dispersion of a reactant throughout the length (or height) and circumference of the reaction zone, thus promoting an even, efficient reaction not prone to uncontrolled detonation. The materials and configuration of the liner also serve to resist the fouling accumulation of scales and precipitates on the reaction side of the liner; the liner is essentially self-flushing due to the flow of reactant through it (radially inward, toward the reaction zone).

The invention additionally presents a means of using cooled exhausted effluent to regulate the temperature of the active exhaust and also to flush the interior surfaces of the exhaust components. Exhausted by-products are withdrawn from the exhaust stream, preferably separated liquids from solids, and cooled in a remotely located conventional heat-exchanger. An important object of the invention is realized when the energy transferred in the primary heat-exchanger is harnessed for unrelated uses. Alternatively or concurrently, energy withdrawn by the heat exchanger may be re-introduced into the reactor system to supplement the heating of injected reactants.

It is an object of the present invention to provide a means and method of utilizing supercritical oxidation to permit highly efficient combustion of fossil fuels, particularly natural gases.

It is another object of the present invention to exploit the reaction conditions of a supercritical reactor to permit system features which dramatically enhance operating efficiency.

It is an object of the present invention to provide a means and method of utilizing supercritical oxidation for thoroughly and safely eliminating or neutralizing hazardous waste.

It is another object of the invention to provide a supercritical oxidation reactor which utilizes supercritical water or other fluid whose temperature can be controlled, such that once the oxidation reaction has been initiated the water can be introduced at a lower externally-controlled temperature and the heat of reaction tapped to maintain reaction temperatures, resulting in direct heat transfer to the reacting water/oxidizer mixture and minimizing the requirement for external heat transfer equipment.

It is another object of the present invention to provide means and methods for operating an oxidation reactor at higher operating temperatures in order to accelerate reaction rates and thereby allow the use of shorter, more compact reactor designs.

It is another object of the present invention to provide a supercritical oxidation reactor that is resistant to fouling, scaling and clogging, and which includes means for dissolving any solids precipitated in the reaction zone and means for flushing other solids, which may not be soluble at subcritical conditions, from the reactor interior and associated equipment.

It is another object of the present invention to provide a means and method to recycle cooled reactor effluent via a thermosiphon, thereby minimizing the need for high-pressure recirculating pumps.

Still another object of the present invention is the provision of means for keeping the reactor pressure-containing vessel at a minimum temperature for increased material strength, thereby allowing the reactor pressure vessel to be constructed from lower alloys.

Another object of the present invention is to prevent apparatus corrosion in the reaction zone of a oxidation reactor by providing a suitable liner material such as ceramic or ceramic-coated metal.

An advantage of the present invention is the use of supercritical reactions to minimize harmful emissions from the reactor into the environment.

An advantage of the present invention is the induction of a radial, inward flow of oxidizer through a permeable liner to reduce the tendency for solids precipitated in the reaction zone to impinge and agglomerate upon the reactor interior thereby obstructing reactor flow.

Another advantage of the present invention is the provision of means for allowing the continuously gradual spacial dispersement of oxidizer into the system to control the release of chemical energy and thereby reduce excessively rapid combustion and destructive detonation.

Other objects, advantages, and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention.

In the drawings:

FIGS. 9a and 9b are schematic diagrams of two other embodiments of a porous liner.

DESCRIPTION OF THE PREFERRED EMBODIMENTS (BEST MODES FOR CARRYING OUT THE INVENTION)

The present invention relates to a supercritical oxidation reactor. In the preferred embodiment of the invention, supercritical oxidation reactions are exploited to boost reaction rates to increase efficiency and reduce undesirable emissions. In the preferred embodiment, methane or other fossil fuel gases (e.g. butane, propane) is mixed with a supercritical mix of water and an oxidizer (e.g. air or oxygen). In an alternative embodiment of the invention, oxidation reactions are exploited to chemically eliminate or neutralize hazardous wastes which are introduced as fuel stock into the reaction chamber. The invention includes, among other advantages, an improved reactor chamber configuration which overcomes many of the disadvantages inherent with existing systems. System features for promoting overall efficiency are also disclosed.

Figure 1:
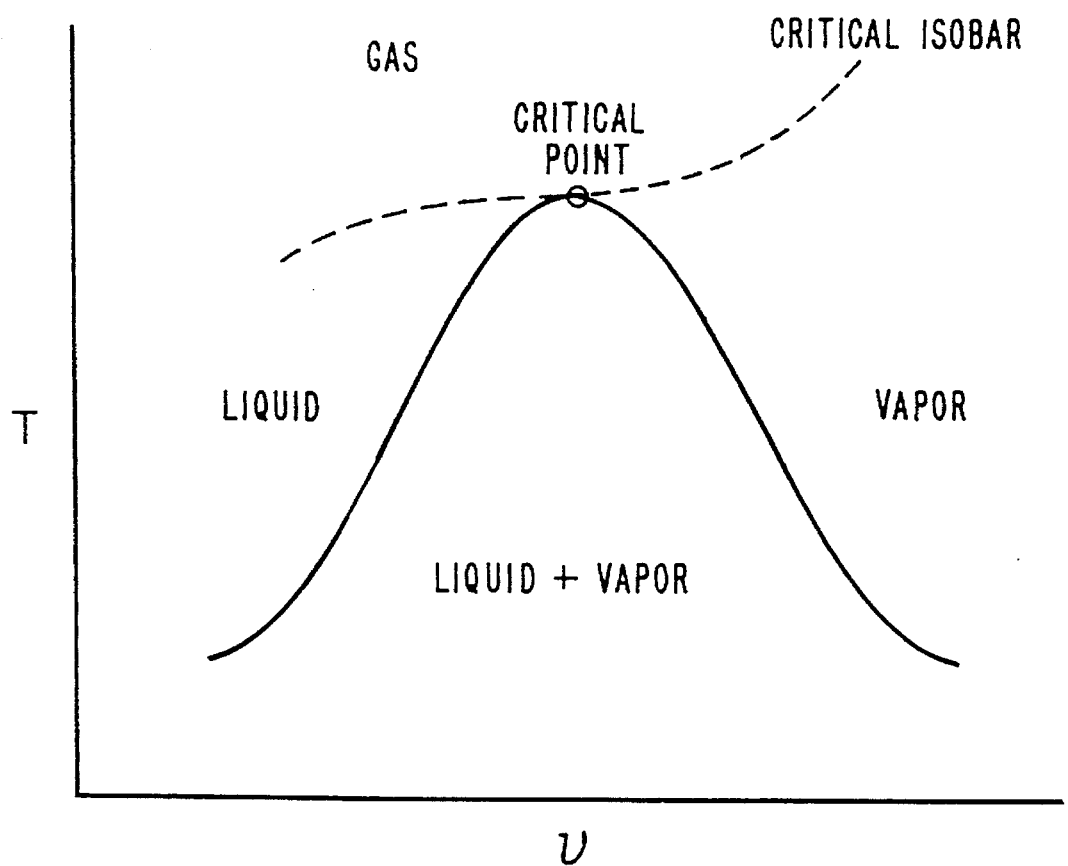
FIG. 1 is a graphical depiction of a typical "vapor dome" phase diagram from the prior art, whereby temperature is plotted on the y-axis and volume is plotted on the x-axis.

As is known in the physical sciences, holding one process condition (i.e. volume) constant throughout a particular process, while varying other conditions (i.e. pressure, temperature) will permit the graphing of an "equilibrium" or "phase" diagram for each process substance. The more important portion of typical a phase diagram illustrates the liquid and vapor regions of a substance. A typical phase diagram showing these regions is shown in FIG. 1 and will have a bell-shaped dividing line, commonly called the "vapor dome."

The vapor dome region can be graphed with a variety of different variables for the axes. For example, either temperature or pressure can be used for the range; energy, volume, or entropy can be chosen for the domain. The area "within" the dome denotes the liquid+vapor phase. The left-hand (rising curve) portion of a typical vapor dome, often called the saturated liquid line, separates the liquid phase of a substance from the liquid/vapor phase. The right-hand (falling curve) section of the vapor dome, called the saturated vapor line, separates the liquid/vapor phase from the vapor phase.

There will be no dividing line, per se, between liquid and vapor at the top of the vapor dome. Far above the vapor dome, there is no distinction made between liquids and gases, as the properties of each are identical and the phase is assumed to be a gas. The implied dividing line between liquid and gas is the line of constant pressure (the "critical isobar," or "critical isotherm," if the range is pressure rather than temperature) which passes through the single top-most point of the vapor dome. This isobar will also provides a way to distinguish on the phase diagram between a vapor and a gas. The top-most point on the vapor dome is known as the "critical point."

In the present invention, the preferred carrier fluid for transporting oxidizer within the reaction chamber is deionized water. Deionized water is preferred in order to minimize the presence of $Ca+$ and $Mg+$ and other ions that contribute to scale formation upon system components. The reaction chamber of the invention preferably operates at temperatures between 450°–700° C. and pressures between $24.0 \times 10^3$–$27.6 \times 10^3$ kPa. The preferable operational temperature and pressure are, therefore, near or somewhat in excess of the critical properties of water, i.e., approximately 374° C. at $22.1 \times 10^3$ kPa (the so-called "critical point").

An important characteristic of reactions in supercritical water is fast reaction rates, due to liquid-like densities and gas-like mass transport properties. Thus, at conditions such as those preferably extant within the invention reaction chamber, molecules of $H_2O$ are at an excited state whereby molecular interaction and reaction are maximized. This super-enhanced intermolecular contact renders soluble in the supercritical water a wide variety of substances that would otherwise be nearly insoluble. Actual combustion likely occurs via a gas phase free-radical mechanism. While the preferred carrier fluid is water, it shall be understood that the invention may satisfactorily be practiced with suitable alternative fluids at supercritical conditions.

An advantage of the present invention is, therefore, that the supercritical condition of the solvent, $H_2O$, elevates the solubility product of the fuel or hazardous waste solute—which in turn increases the rate of the redox reaction whereby the fuelstock is oxidized to more innocuous substances. Certain direct combination or synthesis reactions may also be accelerated. The oxidized by-products may then be disposed of in conventional manners acceptable for non-hazardous substances.

Figure 2:
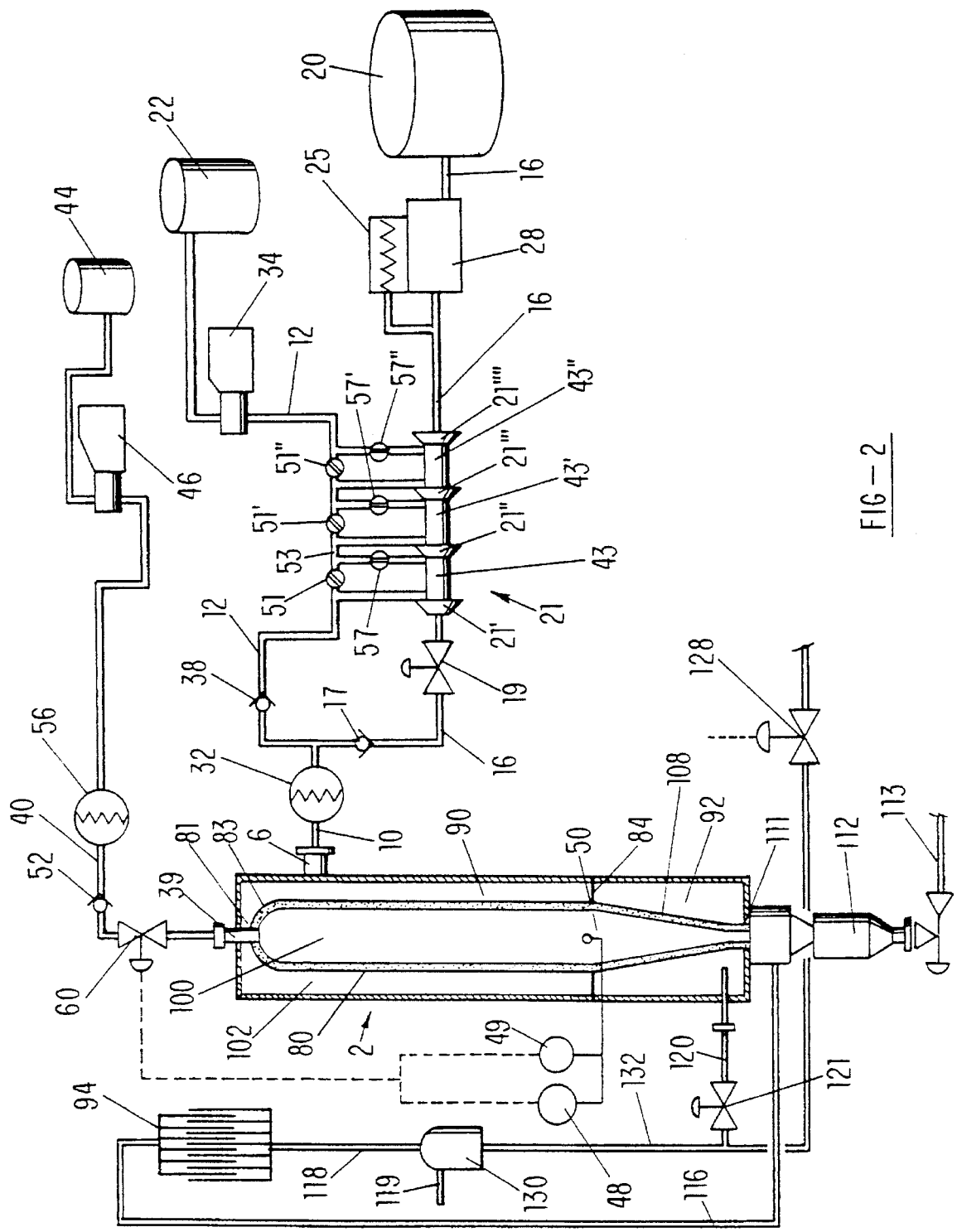
FIG. 2 is a schematic diagram illustrating the preferred embodiment of the invention, including a side sectional view of the reactor pressure vessel.

Attention is directed to FIG. 2. The beneficial reactions of the invention occur within pressure vessel 2, which preferably is a closed right cylinder and is fashioned from stainless steel or other material with comparable corrosion-resistant and high-strength characteristics at high-temperatures. Alloys of titanium and aluminum may advantageously be utilized. Pressure vessel 2 must be so manufactured as to safely contain the high internal pressures, in excess of $20.0 \times 10^3$ kPa (3,500 psia), featured in the invention.

Piercing a side wall of pressure vessel 2 is at least one oxidizer and carrier fluid port 6. A plurality of oxidizer and carrier fluid ports 6 optionally may be radially disposed about the horizontal circumference of the vessel 2. Oxidizer and carrier fluid port 6 permits injection under pressure of oxidizing agent(s) and carrier fluid(s) into the interior of pressure vessel 2. Connected to oxidizer and carrier fluid port 6 is inlet pipe 10, which in turn forms a junction with carrier fluid line 12 and oxidizer line 16. Oxidizer line 16 is a pipe ultimately connected to oxidizer supply 20, while carrier fluid line 12 is a pipe ultimately connected to carrier fluid supply 22. The carrier fluid preferably is de-ionized water. The preferred oxidizer is molecular oxygen ($O_2$), although filtered compressed air is a less costly alternative.

Disposed along oxidizer line 16, between oxidizer supply 20 and inlet pipe 10, is at least one compressor motor 28. Motor 28 is a motor capable of powering the compressor train shown generally at 21. In the preferred embodiment, motor 28 is "cool-air-cool-air" motor, commonly called a CACA motor. The CACA feature of compressor motor 28 includes a motor air cooler 25 installed about the body of motor 28 and connected to oxidizer line 16 to recover heat loss from motor 28. The motor air cooler 25 recovers heat energy generated by the frictional mechanics and electrical windings of motor 28 which would otherwise—in a typical reactor system—be wasted to the ambient air. Motor air cooler 25 serves as a heat exchanger, transferring the recovered heat energy to the oxidizer within line 16, preferably via conductive exchange, or alternatively by direct mixing. By this means, the heat energy generated by motor 28 is retained within the system for later use in boosting the temperature of the oxidizer mix.

As will be appreciated by one skilled in the art, other similar means and methods may be adapted to the apparatus of the invention to collect heat energy from other external heat sources and direct such energy into, rather than out of, the system. This manner of improving overall system efficiency is particularly suited to supercritical reaction process.

Compressor train 21 comprises a plurality of compressors 21', 21", 21'", 21"", powered by motor 28, whose function it is to elevate the pressure of the oxidizer flow to pressures approximating the critical pressure of the carrier fluid. A number of compressive stages normally are required to obtain the high pressure, requiring that two or more compressors be utilized in parallel or in series. FIG. 2 shows four compressors 21', 21", 21'", 21"", in series, for illustration purposes only.

It is known in the art, and basic laws of physics dictate, that pressure is a function of temperature and volume. Accordingly, the compression of a compressible fluid, such as air or oxygen, to high pressures results in the release of substantial amounts of heat. FIG. 2 depicts the use of heat exchange to recover this heat of compression and retain it within the system. As shown in FIG. 2, disposed between each pair of compressors 21', 21", 21'", 21"", is an intercooler 43, 43', 43". An intercooler may also be disposed downstream (e.g. between compressor 21' and valve 19) from the last compressor 21', but is not shown in FIG. 2 for the sake of diagram simplicity.

Each of intercoolers 43, 43', 43" preferably is a "shell and tube" heat-exchanger, known in the art, although other alternative types of conventional heat-exchanger units may satisfactorily be engaged. As shown in FIG. 2, carrier fluid line 12 is so configured as to deliver carrier fluid to the intercoolers 43, 43', 43" in succession. Various arrangements of bypass valves 51, 51', 51", bypass lines 53, and control valves 57, 57', 57" may be utilized to controllably direct flow in carrier fluid line 12 to intercoolers 43, 43', 43". Within each respective intercooler 43, 43', 43" the carrier fluid, by conduction and/or convection, absorbs the heat of compression (and other heat energy, such as that attributable to motor 28) from the oxidizer as the oxidizer exits an associated upstream compressor 21', 21", 21'", 21"". The process is repeated each time the oxidizer exits a compressor, with the result that cooled oxidizer flows into each successive downstream compressor 21.

In accordance with this efficiency-increasing feature of the invention, oxidizer flows through line 16 and enters the first compressor 21"" in the compressor train 21. The oxidizer is there compressed, which increases its temperature. Oxidizer exits compressor 21"" and flows into the first intercooler 43", where excess heat of compression is drawn off by the heat exchanger in intercooler 43". Identical processes concurrently occur with the successive downstream intercoolers 43', 43. Thus, heat is transferred from the oxidizer to the carrier fluid without mixing the two, with the result that supercritical conditions are more efficiently obtained.

An advantage of the present invention is thus apparent. Whereas most fluid compression and transportation processes generate excess heat that is regarded as undesirable, to be somehow directed from the system and wasted, the present reactor system recovers and applies collaterally generated heat. The heat energy of operating pumps and the compression process is identified as a resource to be redirected into the system to assist in the heating of the carrier fluid/oxidizer mix (which is eventually heated to supercritical temperature). The recapture of this collaterally generated heat reduces the amount of energy that must be imported from outside the system in order to achieve supercritical temperatures.

Also disposed along oxidizer line 16 are check valve 17 (barring back-flow of oxidizer) and safety valve 19. Safety valve 19 preferably is "fail closed" and equipped with automated pressure detection and control features known in the art, such that safety valve 19 automatically closes in the event of unsafe pressure conditions within oxidizer line 16 or pressure vessel 2.

Disposed upon carrier fluid line 12 is carrier fluid pump 34, which is a conventional reciprocating rotary or centrifugal pump capable of elevating the in-line pressure of the carrier fluid above the critical pressure of the carrier fluid. Carrier fluid pump 34 preferably is equipped, near its outlet, with automated pressure detection and control devices known in the art which serve to shut off pump 34 in the event of unsafe or undesirable pressures in carrier fluid line 12. Carrier fluid line 12 also has check valve 38 to prevent back-flow of carrier fluid in the line.

Disposed along inlet pipe 10 is heater 32, which may be any form of conventional heater heat exchanger (e.g. electrical) capable of heating the carrier fluid/oxidizer mixture to near the critical temperature of the carrier fluid as it flows through inlet pipe 10. (Alternatively, or in redundancy, heater 32 may be powered by the apparatus' heat of reaction, supplied by lines from primary heat exchanger 94.)

Located at the top of pressure vessel 2 is waste inlet port 39, which permits the injection, under pressure, of fuel into the interior of pressure vessel 2. The preferred fuel is natural gas, which serves to fuel the reaction. A wide variety of alternative fuels may be used, however, including most hazardous substances and liquid wastes. It is also contemplated that the invention may favorably be practiced in the art of hard rock minerals, shale, or bituminous materials processing, whereby a raw slurry is introduced into the fuel stock and the supercritical oxidation process harnessed to extract the desired material (e.g. oil or metallic element) from the slurry mix. The terms "fuel," "slurry," and "waste," as used in the specification and claims, are intended to cover all the foregoing materials, particularly hazardous waste, that may be fed into the reactor as (or with) the fuel stock.

The hazardous waste or other fuel is delivered to waste inlet port 39 via fuel line 40, which is in fluid connection with the fuel source 44. Waste is pumped from fuel source 44 to waste inlet port 39 by the action of injection pump 46 disposed upon fuel line 40. Injection pump 46 boosts the pressure of fuel in fuel line 40 to pressures approaching the critical pressure of the carrier fluid being utilized. Injection pump 46 preferably is equipped, near its outlet, with automated pressure detection and control devices known in the art which serve to shut off pump 46 in the event of unsafe or undesirable pressures in fuel line 40. Waste flowing through fuel line 40 is heated to predetermined temperatures by heater 56, which is a conventional heater/heat exchanger.

Fuel line 40 also has check valve 52 to prevent back-flow of waste in the line. Mounted on fuel line 40 between injection pump 46 and waste inlet port 39 is safety valve 60. Safety valve 60 is electronically connected with sensing devices 48 and signalling devices 49 known in the art, and is a "fail closed" valve. When unsafe or undesirable temperature or pressure or other conditions are detected at critical points in the system (e.g., near the reaction products exhaust, shown generally at 50), automatic signal processing and switching circuitry closes safety valve 60 and shuts down the reactor.

Other conventional plumbing, valving, metering and alarm apparatuses and practices known in the art may be practiced with the invention. Commonly, for example, plumbing and valving are installed permitting pumps and heaters to be bypassed, lines to be drained, fluid flows reversed to their source, and the like. Also, a wide variety of pressure differential detectors and pressure/temperature sensors may be usefully employed to monitor and control, both manually and automatically, digital or analog, the overall operation and safety of the system.

Figure 3:
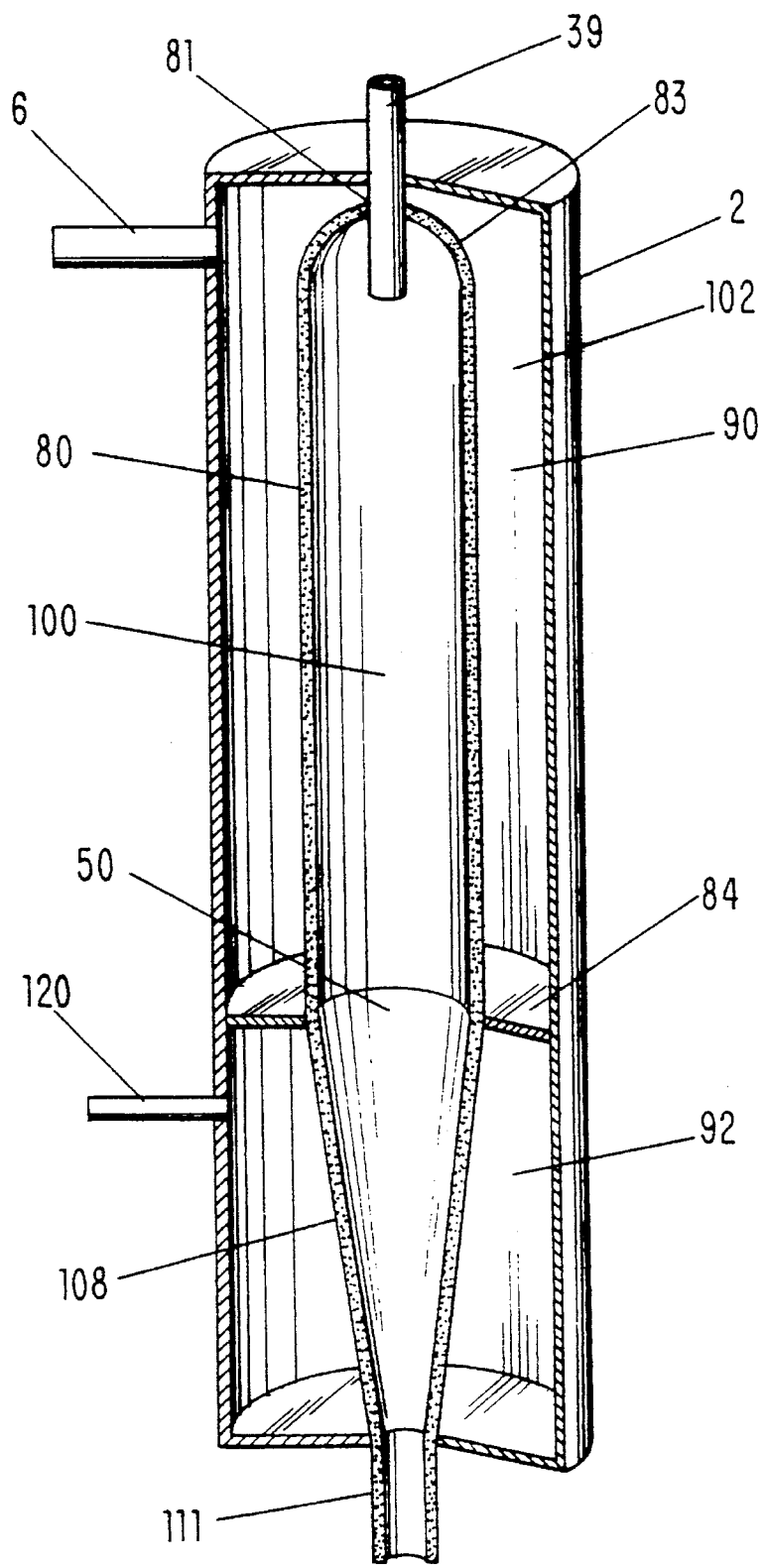
FIG. 3 is a perspective view of the pressure vessel element of the FIG. 2 embodiment, with a section cut away to illustrate associated interior elements.

Combined reference is now made to FIGS. 2 and 3, with particular attention to the details of FIG. 3. As mentioned, pressure vessel 2 is a hollow cylinder whose walls are made of stainless steel or the like. As seen in FIG. 3, pressure vessel 2 is closed with a solid top and bottom. Enclosed within the interior of pressure vessel 2 are a number of fundamental elements of the invention, including porous liner 80 and lower ring wall 84. Lower ring wall 84 functions to partially divide the interior of the pressure vessel 2 into an upper reaction chamber 90 and a lower cooling chamber 92.

Disposed within upper reaction chamber 90 is porous liner 80. In the preferred embodiment, porus liner 80 may be characterized as a hollow cylinder which is concentric about a common vertical axis shared with pressure vessel 80. Near its top, porous liner 80 preferably has a curved semi-hemispherical or parabolic section 83 which fosters the mixture of fuel and oxidizer. Porous liner 80 alternatively may be a hollow truncated cone or frustum, or even a hollow parallelepiped, or other configuration without jeopardizing the utility of the invention. Also, the shape of liner 80 may advantageously have a compound shape, i.e. a frustum in serial, coaxial connection with a cylinder, with collinear axes, in order to accommodate particular applications or reactions criteria.

With specific reference to FIG. 3, it is noted that porous liner 80 has access orifice 81 which is in sealed, fluid connection with waste inlet port 39, so that waste under pressure may be injected through port 39 into the hollow interior of liner 80.

The entire volume of space mostly enclosed within liner 80 and into which waste is injected is the reaction zone 100. The space enclosed between porous liner 80 and pressure vessel 2 is the annulus zone 102. As seen in FIG. 3, the bottom of liner 80 is sealably attached to lower ring wall 84. Thus, reaction zone 100 is separated from the remainder of the upper reaction chamber 90 by porous liner 80.

Porous liner 80 preferably is composed of permeable ceramic. High porosity or perforated ceramics, such as yttria-stabilized zirconia or alumina, may adequately serve. Alternatively, liner 80 may be composed of perforated steel (or other alloy) plate, such as Haynes Alloy 214 or Hastelloy C-276, which likewise serve in the preferred, natural-gas fired embodiment of the invention. Sintered alloys may also be used. In the preferred embodiment, ceramic material is used due to its desirable material properties at high temperature, e.g. strength, resistance to corrosion and oxidation, non-reactive. The structure and microstructure of porous liner 80 is such that fluids under pressure can permeate into and through it from the exterior to the interior.

Thus, an important feature of porous liner 80 is its ability to remain permeable to supercritical oxidizers while withstanding supercritical temperatures and pressures. Extremely high transmissivity is not necessary; the wall of liner 80 allows oxidizers and carrier fluids to flow radially inward from the annulus zone 102, through the porous media of liner 80, and into the reaction zone 100. Under standard operating conditions, such transmission will occur due to a pressure gradient across the liner 80 at a sufficient rate to sustain the oxidation reaction within reaction zone 100.

In all embodiments of the invention, the permeability of liner 80 optionally may be non-uniform, with directed variety along the height/length of liner 80. By deliberately varying the permeability of liner 80, the introduction into a reaction zone 100 of oxidizer/carrier fluid mixture may be optimized to promote mixing, cooling of liner 80, and control of solid accumulates. For example, the permeability of liner 80 may advantageously be higher in the area proximate to exhaust 50, in order that incoming oxidizer/carrier fluids may quickly flush from that portion of the liner 80 the solid precipitates that may tend to accumulate there. Similarly, the permeability of liner 80 may be comparatively lower in the immediate area near inlet port 39, in order to minimize destructive detonation in that portion of the reaction zone 100. Thus, the permeability of the liner 80 may vary as a function of distance(s) from inlet port 39 and/or exhaust 50.

Having continued reference to both FIGS. 2 and 3, it is observed that the annulus zone 102 is as tall as the liner 80, such that the oxidizer/carrier mix is able to permeate and penetrate the liner 80 throughout its height (as well as throughout its circumference). This may be contrasted with many devices of the existing art, which introduce the oxidizer at one or two discrete points, usually near the point of fuel injection, resulting in explosive mixtures. In these existing devices, destructive detonation may occur near the point of oxidizer injection, and hot spots often form and shorten reactor life. In the present invention, the continuous introduction of oxidizer across the overall height of the liner 80 suppresses spontaneous detonation and promotes uniform, efficient reaction throughout the height of the reaction zone 100.

Below reaction chamber 90, but within pressure vessel 2, is cooling chamber 92. Within cooling chamber 92 is exhaust funnel 108, a hollow, inverted frustum whose base is sealably attached, throughout its circumference, to the bottom edge of porous liner 80. As seen in FIG. 3, the juncture of liner 80 with exhaust funnel 108 is at or near the juncture of the former with the lower ring wall 84. Exhaust funnel 108 is composed of the same or similar materials as the porous liner 80, e.g. ceramic or perforated alloy plate. Disposed within exhaust funnel 108, radially inward and downward, may be one or more cooling baffles (not shown) to foster the exhaust cooling process. Exhaust funnel 108, functions to collect and direct reaction by-products existing the reaction zone 100 via the reaction products exhaust 50 (the large orifice in lower ring wall 84). Reaction by-products are cooled by passage through exhaust funnel 108, which induces solids to precipitate out of the exhaust solution.

Because exhaust funnel 108 is fashioned from a porous, permeable material, as with liner 80, the exhaust funnel 108 benefits from similar advantages. The higher concentration of cooled effluent at the inner surface of funnel 108, and the heat exchange between the cooled effluent and the wall of funnel 108, promotes funnel 108 longevity.

An outlet at the bottom of exhaust funnel 108 pierces the bottom wall of pressure vessel 2 and thus functions as by-products outlet 111. With combined reference to FIGS. 1 and 2, it is seen that by-products outlet 111 is connected to a solids separator 112, comprising a cyclone-type separator and/or a series of filter screens whereby solid by-products are physically separated from liquids. Solid waste precipitates are discharged from the system at insoluble solids outlet 113 for proper disposal.

Attention is again directed to FIG. 2. Liquid by-products separated by solids separator 112 are directed into liquid effluent line 116 and flow therethrough to primary heat exchanger 94. Primary heat exchanger 94 may be any suitable means for recovering heat from the flowing effluent, such as a conventional dual-coil in-tank exchanger, steam engine, or the like. Extraction of heat energy via primary heat exchanger 94 accomplishes one of the objects of the invention, i.e., the provision of a clean, efficient energy source. The outlet of heat exchanger 94 is connected to transfer line 118 wherefrom liquid effluent may be discharged to downstream processes, or to proper disposal.

It is observed that the invention thus includes a manner whereby partially-cooled combustion by-products are passed through a heat-exchange system, allowing generated heat energy to be used either for process requirements or transferred for external uses. The reactor primary cycle may be integrated with secondary cycles in a variety of ways. In the preferred, binary cycle embodiment, the primary cycle containing the reactor supplies heat to a steam generator, which produces heated steam from treated feedwater for use in a separate secondary cycle. Such a binary cycle offers several advantages.

The first advantage is that, for a given set of reactor primary cycle operating conditions, steam can be generated in the secondary cycle at almost any thermally-equivalent combination of pressure, temperature, and mass-flow rate. This kind of flexibility allows the apparatus of the invention to be installed in parallel with existing steam boilers, and eliminates the need for dedicated supercritical steam turbines and equipment. Also, the primary cycle can be optimized for maximum reliability and minimum cost, largely independently of the requirements of the secondary cycle; only the primary heat exchanger 94 needs to be optimized for the requirements of the secondary cycle. In the latter regard, it is noted that only static mechanical equipment comes into contact with the hot reactor by-products.

The primary heat exchanger 94 may be designed for other types of secondary power/heat cycles. Alternative secondary cycles include: pre-heating of the process reactants, prior to introduction into reaction zone 100, in a regenerative gas turbine cycle; pre-heating of combustion air for conventional steam boilers; or heating of air for industrial heating/drying applications.

As an alternative to a binary cycle system, the apparatus can be configured as a simple single cycle arrangement, with the hot effluent being expanded in a supercritical steam turbine.

As shown in FIG. 2, transfer line 118 optionally may lead to a high-pressure two-phase gas/liquid separator 130 of construction familiar to the art. Separator 130 separates gaseous effluent from liquid effluent. The former may be exported from the system, under pressure and via gas effluent line 119, for commercial utilization. The high-pressure gaseous effluent optionally may be expanded through a turbo-expander for power recovery, as the high-pressure gases contain appreciable amounts of energy capable of being tapped by expansion. Effluent gases also may be separated into constituent gases ($N_2$, $CO_2$, $O_2$) and sold or utilized in a variety of industrial applications. Oxygen under pressure optionally may be recycled to the reactor inlet 6, allowing a reduction in the required compression capacity of compressor train 21. Separated liquid effluent continues out of separator 130 through discharge line 132.

The flow of by-product effluent through effluent line 116, heat exchanger 94, and transfer line 118 may be induced and accomplished by means of a thermosiphon, as the effluent rising up effluent line 116 is hotter than the cooled effluent flowing down transfer line 118 from physically elevated heat exchanger 94. Utilization of a thermosiphon reduces the need to incorporate high-temperature and high pressure pumps in effluent line 116.

An advantageous feature of the invention is the presence of coolant line 120 connected to discharge line 132 and leading to the interior of cooling chamber 92. By means of coolant control valve 121, cooled liquid effluent flowing through transfer line 118 may controllably be allowed to flow through the wall of pressure vessel 2 and into cooling chamber 92. The cooled effluent then permeates radially inward from cooling chamber 92, through exhaust funnel 108 (which, as mentioned, is composed of permeable ceramic or sintered/perforated steel, like unto porous liner 80). Cooled effluent thereupon mixes with hot-by-products vented through exhaust 50 and passing through exhaust funnel 108. Cooled liquid effluent thus can be used controllably to cool the hot reaction exhaust.

Cooled effluent passing inward through exhaust funnel 108 may also be used to flush the interior of exhaust funnel 108 and wash accumulated precipitates therefrom in a fashion analogous to the self-flushing character of porous liner 80. This cleansing function is especially desirable in the case of precipitates that are soluble in the cooled effluent but insoluble in the hotter exhaust.

Figure 4:
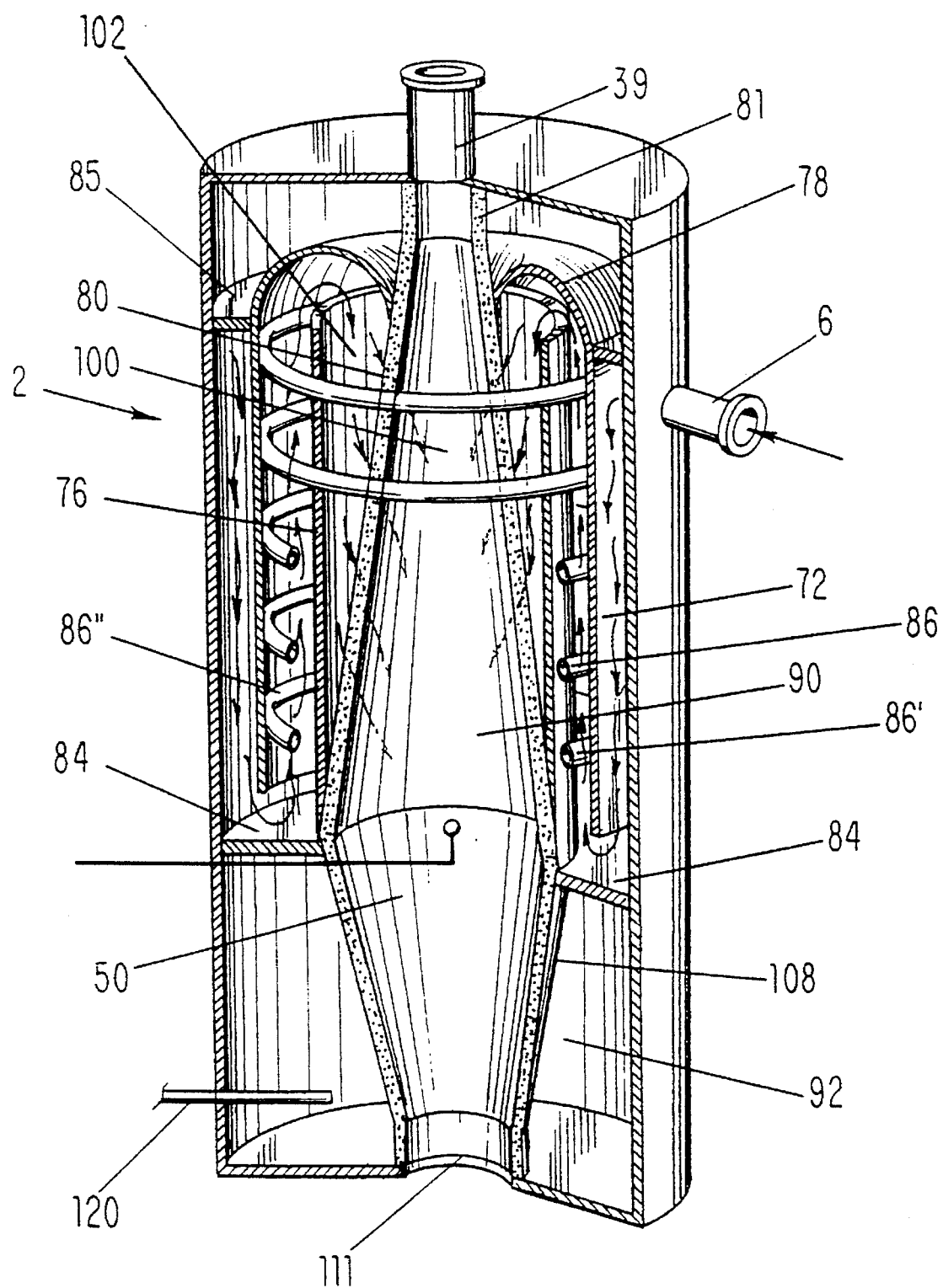
FIG. 4 is a perspective view of an alternative embodiment of the FIG. 3 embodiment.

Attention is directed to FIG. 4, showing an alternative embodiment of the reactor vessel of the invention. This alternative embodiment is more complicated than the preferred embodiment in configuration and construction, and differs from the preferred embodiment principally in the placement of heating elements 86 within the pressure vessel 2. In the preferred embodiment, the heating of the carrier fluid and oxidizer is accomplished by heater 32 completely exterior to the pressure vessel 2; in this alternative embodiment, heating of the oxidizer/carrier fluid mix is accomplished in part within the pressure vessel 2, adding some efficiency with complexity. With the exception of the interior placement of the heating elements 86, 86', 86" and associated structures, the alternative embodiment functions analogously to and with the same objects as the preferred embodiment in all respects and particulars.

In the alternative embodiment, additional elements are enclosed within the interior of pressure vessel 2. Enclosed therein are heat wall 72, reaction barrier 76, flow deflector shell 78, and porous liner 80. Other illustrated elements within the interior of the pressure vessel 2 are lower ring wall 84, upper ring wall 85, and heating elements 86, 86', 86".

Lower ring wall 84 is a horizontal annular wall disposed around the interior wall of pressure vessel 2. As in the preferred embodiment, lower ring wall 84 functions to partially divide the interior of the pressure vessel 2 into an upper reaction chamber 90 and a lower cooling chamber 92. Heat wall 72, made of stainless steel or like material resistant to corrosion, preferably is a circular wall forming a right cylinder open at top and bottom. Reaction barrier 76 likewise preferably is a curved wall forming a right cylinder, and is fashioned from stainless steel or the like. As can best be seen in FIG. 4, pressure vessel 2, heat wall 72, and reaction barrier 76 preferably are concentric about a common vertical axis, with pressure vessel 2 enclosing the other two, and with heat wall 72 disposed between pressure vessel 2 and reaction barrier 76.

Disposed within upper reaction chamber 90 of the alternative embodiment is porous liner 80. In the alternative embodiment, porous liner 80 may be characterized as a hollow, truncated cone or frustum which is concentric about a common vertical axis shared with pressure vessel 80. With specific reference to FIG. 4, it is noted that porous liner 80 has access orifice 81 which is in sealed, fluid connection with waste inlet port 39, so that waste under pressure may be injected through port 39 into the hollow interior of liner 80.

Porous liner 80 in the alternative embodiment serves the same purposes and functions as in the preferred embodiment. The alternative embodiment includes a annulus zone 102 in the space enclosed between porous liner 80 and barrier 76. The space within liner 80 and into which waste is injected is the reaction zone 100. Reaction barrier 76, besides aiding in the direction of fluid flow, serves as a protective shield between annulus zone 102 and heat wall 72. In the event of a failure of liner 80, reaction barrier 76 acts to at least partially contain the reaction while the system is shut down.

In the alternative embodiment, the shape of porous liner 80 is that of a frustum. The frustum shape promotes uniformity of the velocity of the reactant stream within reaction zone 100. The increasing horizontal diameter of the reaction zone 100—a result of the conical character of liner 80—presents an ever-increasing cross-sectional discharge area as the reactants and by-products flow from waste inlet port 39 toward exhaust funnel 108. The increasing cross-sectional area (proceeding from top to bottom of liner 80) at least partially compensates for the increasing contained mass attributable to the continuous addition of oxidizer/carrier fluid throughout the height of liner 80, and also the volumetric expansion of reactants due to the heat of reaction. Uniformity of velocity of reactants throughout reaction zone 80 is promoted, resulting in manageable exhaust velocities in the vicinity of reaction products exhaust 50.

Continued reference is made to FIG. 4. At the top of pressure vessel 2 is deflector shell 78, which in the alternative embodiment is shaped like a horizontally situated semi-toroid, and is composed of a material common to barrier 76 and heat wall 72. Deflector shell 78 extends from the top of heat wall 72 to the top of liner 80 near the junction of liner 80 with inlet port 39. Also sealably attached to heat wall 72, preferably at its top and near its juncture with deflector shell 78, is upper ring wall 85. Upper ring wall 85, an annulus, forms a seal between heat wall 72 and the inside face of pressure vessel 2.

Disposed on or within the heat wall 72 are heating elements 86, 86', 86". Heating elements 86, 86', 86" preferably are conventional electrical resistance-type heating coils. Heating elements 86, 86', 86" serve to elevate to critical levels the temperature of oxidizer and carrier fluids flowing to the critical zone 102 from fluid port 6. Heating elements 86, 86', 86" may be disposed in an annular, or spiral, configuration concentrically about the vertical axis of pressure vessel 2. An annular configuration, i.e. a plurality of parallel rings vertically "stacked" within heat wall 72, is preferable. Such an arrangement allows for "multizone" temperature control, whereby the temperature of discrete elements or groups of elements 86, 86', 86" in a particular portion of heat wall 72 are independently controlled to allow for predetermined temperature gradients along the height of heat wall 72.

Cooling chamber 92, exhaust funnel 108, and coolant line 120 serve the same functions and in the same manner as in the preferred embodiment.

With renewed attention to FIG. 2, the method of operation of the invention conforms with the foregoing descriptions of the apparatus. Safety valve 19 and other valves are opened to permit oxidizer to flow from oxidizer source 20 and carrier fluid to flow from carrier fluid source 22 into their respective lines 16 and 12 and then into inlet pipe 10 where they turbulently mix. Carrier fluid pump 34 and compressor train 21 are actuated to pressurize the carrier fluid and oxidizer in lines 16 and 12. Heater 56 is activated to heat fuel as it flows through line 40 toward inlet port 39.

At inlet pipe 10, the flowing carrier fluid and oxidizer are mixed by turbulent flow and then are injected into pressure vessel 2 at one or more oxidizer and carrier fluid ports 6. Ports 6 may be oriented within pressure chamber 2 as to foster turbulent mixture of fuel and oxidizer within reaction zone 100. In the alternative embodiment of the invention, concurrently or prior to the flow of oxidizer and carrier fluid through port 6, heating elements 86, 86', 86" are turned on, elevating the temperature of the immediate vicinity of heat wall 72.

The oxidizer/carrier fluid mixture, having been heated by heater 32 and pressurized by compressor train 21 and carrier fluid pump 34 to critical conditions of temperature and pressure, flows into reaction chamber 90, filling annulus zone 102. The mixture passes through porous liner 80 into reaction zone 100, where it mixes with fuel entering through inlet 39. The substances spontaneously react and hot byproducts are exhausted through exhaust funnel 108 and into by-products outlet 111.

The general course and direction of flow of the oxidizer/carrier mix through the alternative embodiment of the invention is depicted by the diagrammatic flow arrows in FIG. 4. It will be recalled that the system is concentric about the vertical axis; the flow of the oxidizer/carrier mix is circumferential within pressure vessel 2 and occurs within the voids separating the parallel and concentrically disposed walls of pressure vessel 2, heat wall 72 and reaction barrier 76, until the mix flows into annulus zone 102.

Under pressure, the oxidizer/carrier fluid mix enters the pressure vessel at port 6 and flows downward between the interior wall of pressure chamber 2 and heat wall 72 (shown by the directional arrows in FIG. 4). Upward flow is blocked by upper ring wall 85. As it flows downward and parallel to heat wall 72, the temperature (as well as pressure) of the oxidizer/carrier fluid mix is increased by conduction and/or induction, due to the proximity of hot heating elements 86, 86', 86". Downward flow between the interior face of pressure vessel 2 and heat wall 72 continues until blocked and reversed by lower ring wall 84.

Continuing reference to the directional arrows of FIG. 4 shows that the flow of the oxidizer/carrier fluid mix thereupon continues upward through the cylindrically-shaped space separating heat wall 72 from reaction barrier 76. The flow is parallel to heat wall 72, and the proximity of heating elements 86, 86', 86" continues to boost the temperature of the mix until the mix rises to the top of reaction barrier 76, at which point the mix has assumed supercritical conditions of temperature and pressure. The supercritical mix of oxidizer and carrier fluid is deflected into the annulus zone 102 by flow deflector shell 78. The supercritical mix then fills the annulus zone 102 between porous liner 80 and reaction barrier 76. Due in part to the higher pressures within the annulus zone 102, the oxidizer/carrier mix passes through the porous liner 80 (throughout its height) and enters the reaction zone 100.

In all embodiments, the reaction is commenced by opening safety valve 60, operating injection pump 46, and actuating fuel heater 56 in order to supply hot fuel or waste to inlet port 39 via fuel line 40. The fuel waste is thereby dispersed into the reaction zone 100, where it contacts and mixes with the oxidizer that has passed through porous liner 80. The reaction is then spontaneous and accelerated by the supercritical condition of the oxidizer/carrier mix.

The reaction takes place within reaction zone 100, and heat is generated. The heat of reaction often is adequate to sustain further reaction, without the application of additional external energy, provided the flow of fuel and oxidizer is unabated. Under desirable conditions, the heat of reaction will be sufficiently high as to permit the shut down of some, or the substantial reduction in temperature of all, of heating elements 86, 86',86" or heater 32.

For exothermic reactions, the reaction zone 100 can be operated at higher temperature than the temperature of the incoming oxidizer/carrier fluid mixture, thus establishing an increasing temperature gradient from the annulus zone 102 towards the center of reaction zone 102. By virtue of direct heat exchange between the incoming oxidizer/carrier fluid mixture and the wall of liner 80, and the higher concentration of oxidizer/carrier fluid due to incomplete mixture of all reactants near the interior surface of liner 80, the temperature at the interior wall of liner 80 is lower than the temperature in the fully-mixed reaction zone 100. The resistance of liner 80 to thermal degradation is thereby improved.

Similarly, due to the comparatively elevated concentration of oxidizer/carrier fluid at the inner surface of liner 80, the concentration of corrosive reaction products is lower at the inner surface of liner 80 than in the fully-mixed inner areas of reaction zone 100. This advantage, coupled with the comparatively lower temperatures near the inner surface of liner 80, promotes resistance to corrosive degradation of liner 80.

Several advantages of the present invention are here apparent. Existing apparatuses do not incorporate a liner such as liner 80 or a reaction barrier such as barrier 76, and accordingly generally must have pressure vessels fashioned from exotic, comparatively expensive alloys capable of withstanding the ultra-high temperatures and corrosive chemistries extant within the reaction zone. In the present invention, the presence of liner 80 (and, in the alternative embodiment, barrier 76) isolates the reaction, and its resulting extreme temperatures, from direct contact with pressure vessel 2. Consequently, pressure vessel 2, while still necessarily subjected to elevated temperatures and high pressure, need not be specially assembled and/or manufactured from nearly as exotic of a material, at a substantial savings in materials cost.

Additionally, existing supercritical reactor apparatuses are frequently beset with fouling and scaling problems attributable to the accumulation of precipitates upon the metallic interior walls of their reaction chambers. Salts, sulfates and nitrates are frequently encountered scales and precipitates which clog and corrode the inner surfaces of the typical reactor chamber. The present invention reduces or eliminates this problem by incorporating permeable media at key locations within the reactor. An important process is the flowing of the supercritical oxidizer through the wall of liner 80. The flowing oxidizer, as it emerges through the interior face of liner 80, tends to flush precipitant and scale therefrom at a rate equalling or exceeding their rate of accumulation. The liner 80 thus is practically self-cleaning during the course of operation of the invention.

Additionally, the heat of reaction of the present invention is substantially less than the ultra-high temperatures extant in conventional combustion incinerators. This reduced temperature results in the formation of comparatively fewer noxious $NO_x$ compounds to be expelled in the exhaust.

After the reaction has been ignited, and a self-sustaining reaction commenced, the temperature of heater 32 and/or heating elements 86, 86', 86", can be reduced, thus lowering somewhat the temperature of the oxidizer/carrier mix that passes through the liner 80. This cooler mix may aid the flushing of precipitates from the inside surface of liner 80, since some of the accumulated precipitates may be redissolved by a solute substantially cooler (e.g. sub-critical temperature) than the reaction temperature.

Reaction by-products exit the reaction zone 100 and enter the space within the exhaust funnel 108. By-products cool in exhaust funnel 108, which cooling may be enhanced and regulated by the controlled entry of cooled liquid effluent through porous exhaust funnel 108. Exhausted by-products are maintained, however, at a sufficiently high temperature (in the preferred embodiment, about 450° C.) such that solids precipitating out of the reactant mix do not redissolve into the liquids. Such elevated temperatures are maintained in the solids separator 112, so that solid precipitates may be separated and withdrawn from the system. Liquid by-product effluent is separated by the separator 112 and forced into effluent line 116. Solid by-product is released through solid waste line 113. The thermosiphon or alternative mechanical pumping pumps the effluent to primary heat exchanger 94 where excess heat can be extracted and used. Cooled effluent not pumped through coolant line 120 is discharged through waste control valve 128 and out of the system.

The invention offers an advantageous means of harnessing the heat of reaction by utilizing a primary heat exchanger 94 that is external to the pressure vessel 2. Many existing devices attempt to extract the heat of reaction directly from the walls of their pressure vessels, while also supplying heat to the reaction zone via those same walls— with inconsistent and inefficient results.

The invention also can advantageously comprise the following enhancements to the basic system described above:

1. Incorporation into waste inlet port 39 enhanced mixing means and precombustion chamber operating at near-stoichiometric ratio between reactants;

2. Optional inclusion of separator 112 within pressure boundary of pressure vessel 2;

3. Alternative manufacturing methods for porous liner 80, including incorporation of a heat exchanger into the wall of porous liner 80;

4. Expanded materials of construction for porous liner 80;

5. Operation of separator 112 to allow full or partial recovery of clean water for recycle within the process;

6. Recirculation of cooled brine collected from separator 112 for cooling of exhaust by-products;

7. Expanded waste/fuels that can be processed by the present invention;

8. Extended range of reactor operating pressure to below the critical pressure of water (221 bar), to as low as 25 bar;

9. Extended the range of maximum possible local reaction temperature to greater than 1,000 degrees C.; and 10. Preheating of waste/fuel by direct mixing with superheated water.

The present invention may be used to process fuels including; industrial waste waters containing toxic, hazardous, and non-hazardous organic and inorganic wastes; organic sludges and waste waters from pulp and paper mills, municipal sewage treatment plants, biological waste treatment processes, petroleum production and processing industries, chemical and allied product industries, food processing and agricultural industry, textile industry organic wastes, including dyestuffs, and coal processing processes; oils, solvents, cutting fluids, coolants, hydraulic fluids, and other wastes from shipboard applications; organic sulfur compounds including pesticides, chemical warfare agents; organic nitrogen compounds including rocket propellants, high-explosives, and associated processing waste streams such as "red" & "pink" water; military smokes, dyes and pyrotechnic materials; radioactive mixed wastes; ammonia, nitrates and nitrites; and biomass-derived substances, including raw biomass slurry, algae, and processed fuels such as ethanol, methanol and oils.

The present invention is designed to produce a stable diffusion-type combustion regime where reaction rates are limited by the mixing and diffusion rates for the reactants. Peak local reaction temperatures may exceed 700 degrees centigrade. Peak local reaction temperatures may conceivably reach as high as 3,000 degrees centigrade, as occurs in conventional diffusion-type combustion systems known in the art. At any given supercritical temperature, gradual changes in reaction pressure produce correspondingly gradual changes in physical and thermodynamic properties of the reactants and products within the reaction zone. The range of variation in estimated physical properties of the reaction products along the 550 degrees C. supercritical isotherm is illustrated in the table below:

| Pressure bar | 250 | 200 | 150 | 100 | 50 | 25 |
|---|---|---|---|---|---|---|
| Temperature C. | 550 | 550 | 550 | 550 | 550 | 550 |
| Density lbm/ft3 | 5.34 | 4.23 | 3.13 | 2.07 | 1.02 | 0.51 |
| Heat Capacity (Cp) BTU/lbm-F. | 0.53 | 0.50 | 0.48 | 0.45 | 0.43 | 0.42 |
| Specific Enthalpy BTU/lbm | −3,809 | −3,798 | −3,787 | −3,776 | −3,765 | −3,760 |

For a 90% reduction in pressure, there is a 90% reduction in density, a 1.3% increase in specific enthalpy, and a 21% reduction in heat capacity.

The present invention may be used over a wide range of temperatures and pressures to the extent that the changes in properties permit stable and efficient operation. More specifically, the present invention may be used for oxidation reactions at supercritical conditions where the reaction temperature exceeds 374 degrees centigrade, but where the corresponding reaction pressure is significantly less than 221 bar, and as low as 25 bar. The ability to operate the present invention at pressures lower than 221 bar results in increased safety, decreased costs for compression and pressure containment equipment and decreased space and weight.

Figure 5:
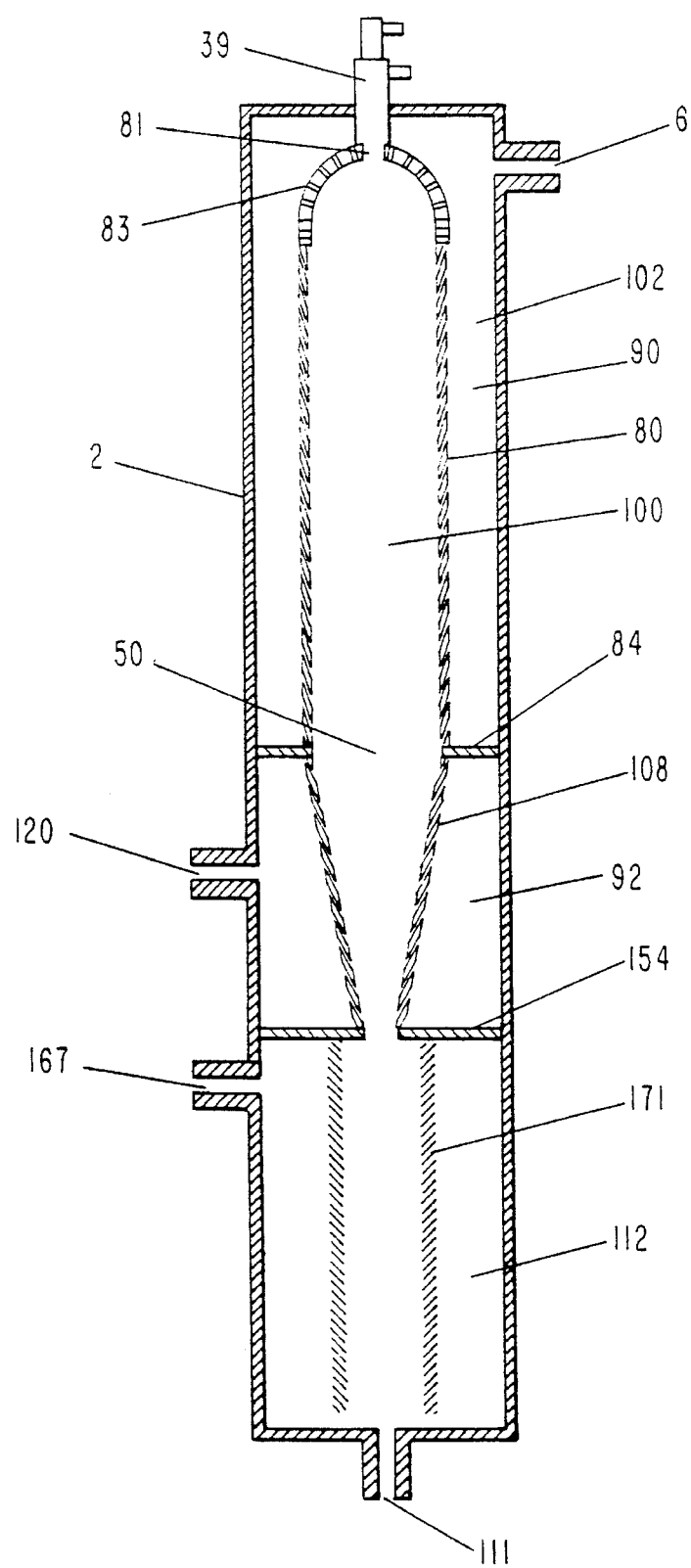
FIG. 5 is a side sectional view of an alternative preferred embodiment of the pressure vessel element.
Figure 6:
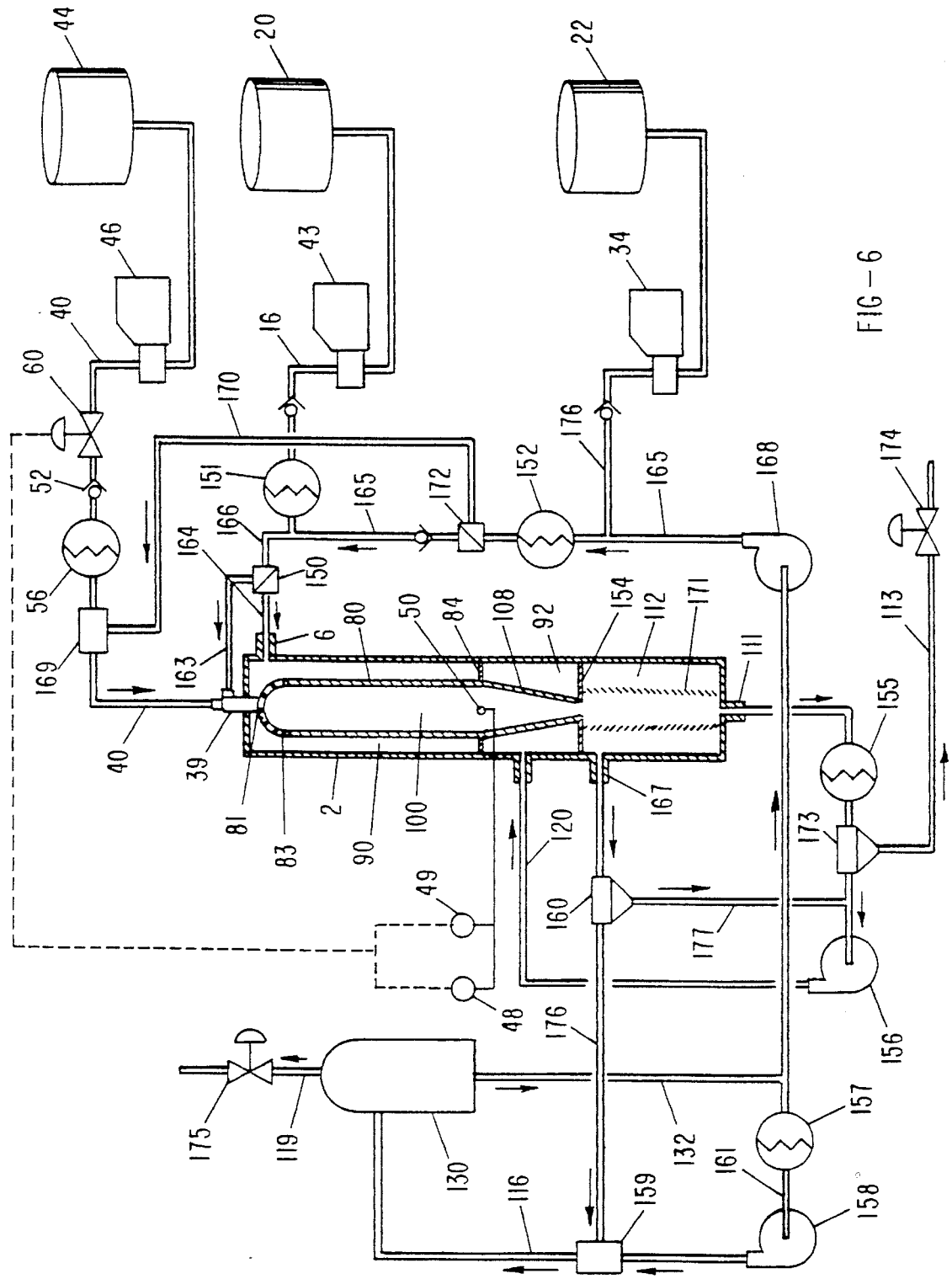
FIG. 6 is a schematic diagram of an alternative preferred embodiment of the invention, including a side sectional view of the reactor pressure vessel of FIG. 5.

Attention is directed to FIGS. 5 and 6. The supercritical water oxidation process, also known as hydrothermal oxidation process, occurs within pressure vessel 2, which is preferably a closed right cylinder fabricated from a pressure vessel alloy meeting the requirements for containing the contents of the vessel at the operating pressure and temperatures within. Suitable materials for this pressure vessel include chrome-nickel alloys such as Alloy C-276, Alloy C-22, and Alloy 625 and others as known in the art. The pressure within the pressure vessel may be anywhere between atmospheric pressure and 345 bar, depending on the design operating pressure selected. Pressure vessel 2 may be comprised of any number of pressure containing sections that may be connected together by welded connections, bolted flanges, clamp flanges or other mechanical means as known in the art.

Piercing the vessel pressure boundary 2 is at least one inlet port 6 for injection of a pressurized mixture consisting of the oxidizer, typically oxygen or filtered compressed air, plus the carrier fluid, typically water. Connected to the inlet port 6 is inlet pipe 164, which in turn is connected to flow proportioning device 150. Flow proportioning device 150 consists of a multiport valve or set of orifices or other device or combination of devices known in the art, and is designed to direct a portion of the oxidizer/carrier fluid mixture carried in line 166 to inlet port 6, and the remaining portion of this mixture to the waste inlet nozzle 39. The flowrate of oxidizer/carrier mixture to waste inlet nozzle 39 is such that a 90% to 110% stoichiometric ratio of waste/fuel-to-oxidizer is supplied to waste inlet nozzle 39. Oxidizer line 16 joins oxidizer/carrier mixture line 166 and recycle line 165 upstream of flow proportioning device 150 to allow thorough mixing of oxidizer and carrier fluid.

Disposed along oxidizer line 16 is heater 151 of any suitable type known in the art for heating the oxidizer prior to mixing with the carrier fluid. Sufficient heat must be supplied by heater 151 such that a single phase mixture of oxidizer and carrier fluid is maintained in line 166. Also disposed along oxidizer line 16 is oxidizer pump 43 designed to provide adequate pressure to sustain flow of oxidizer from oxidizer source 20. Oxidizer pump 43 may be designed to pump a liquid oxidizer such as liquid oxygen or hydrogen peroxide or nitric acid. Alternatively, oxidizer pump 43 may be designed to pump a compressible gaseous oxidizer such as gaseous oxygen or filtered air. In those instances where pump 43 is designed to pump a compressible gas, it may be possible to recover heat energy from any interstage coolers for use in the process by means similar to those described in FIG. 2, or for uses external to the process.

Disposed along recycle line 165 is heater 152 of any suitable type known in the art for heating the recycled carrier fluid, typically water, prior to mixing with the oxidizer. Sufficient heat must be supplied by heater 152 such that a single phase mixture of oxidizer and carrier fluid is maintained in line 166. For operating pressures less than the critical pressure of water (221 bar), heater 152 will have to incorporate both an evaporator apparatus plus a superheater apparatus, both as known in the art. For operating pressures greater than the critical pressure of water, heater 152 may be of a "once-through" design as known in the art. There is a narrow range of operating pressure immediately below the critical pressure of water which may have to be avoided as most evaporators known in the art require a minimum difference in density between the vapor and liquid phases of water. This density difference disappears as pressure is increased to the critical pressure.

Referring momentarily to FIG. 6 in combination with FIG. 5, either or both of heater 151 and heater 152 may alternatively comprise a regenerative heat exchanger forming an integral part of the wall of porous liner 80, to allow direct recovery of heat energy from the contents of the reaction zone 100. Disposed along waste/fuel line 40 is an open heat exchanger 169 which heats the waste/fuel to desired temperature by direct mixing with heated recycle water supplied via line 170. For organic waste/fuels, direct mixing with high temperature superheated water will result in various hydrogenation and pyrolysis reactions as are known in the art. These reactions may serve beneficial purpose by producing more readily combustible compounds from the waste/fuel. Open heat exchanger 169 may accomplish mixing of waste/fuel and hot water via a porous liner, smaller but similar to porous liner 80, whereby the radially inward flow of hot water through the liner wall serves to resists accumulation of undesirable deposits on the inner surface of open heat exchanger 169. Also disposed along waste/fuel line 40 is closed heat exchanger 56 for preheating the waste/fuel and non-return valve 52 for preventing backflow in the line and safety valve 60. Safety valve 60 is electronically connected with sensing devices 48 and signaling devices 49 known in the art, and is a "fail closed" valve. Also disposed along waste/fuel line 40 is waste/fuel feed pump 46 which supplies waste/fuel to the process from waste/fuel source 44.

Hot water line 170 supplies hot water from immediately downstream of heater 152, upstream of the intersection with oxidizer line 16 to prevent flow of oxidizer to open heat exchanger 169. Flow proportioning device 172 regulates the proportion of hot water flow supplied to open heat exchanger 169, and how much is supplied for mixing with the oxidizer in line 166. Disposed along recycle line 165 is recycle pump 168 of any suitable type known in the art and is designed to maintain the required flowrate of recycled carrier fluid, typically water. Intersecting with recycle line 165 upstream of heater 152 is make-up carrier fluid (typically water) line 176 supplied to the process by make-up pump 34 which in turn is supplied by make-up source 22.

Make-up water may be required to compensate for any water losses from the process such as blowdown, for start-up purposes, and for periodic flushing of deposits from internal areas of the process system.

Combined reference is now made to FIGS. 5 and 6. As mentioned, pressure vessel 2 is a hollow cylinder whose walls are made of a suitable pressure vessel alloy. Pressure vessel 2 is closed with a solid top and bottom. Enclosed within the interior of pressure vessel 2 are a number of fundamental elements of the invention, including porous liner 80 and lower ring wall 84. As described elsewhere, lower ring wall 84 functions to partially divide the interior of the pressure vessel 2 into an upper reaction chamber 90 and lower cooling chamber 92. In this embodiment, we have extended the pressure boundary of pressure vessel 2 to include separator 112 which serves the purpose of separating the liquid and solid phases from the vapor phase prior to subsequent processing. A ring wall 154 is located at the bottom of cooling chamber 92 thereby isolating this chamber from separator 112. Separator 112 is a gravity-type separator as known in the art, and may incorporate any combination of separation device known in the art for assisting the separation liquid and vapor phases. These include inertial separation devices such as hydrocyclones and louvers, and impingement/coalescing devices such as mist mats. In FIG. 5, attention is directed to reverse-louvered baffle tube 171, the bottom end of which extends below the normal liquid level in separator 112. The reverse-louver device works on the principal that any liquid/solid particles would first be required to overcome their initial downward inertia and reverse direction in order to flow to vapor outlet port 167. Thus, the flow through the louvers is primarily the less-dense vapor phase with lower unit inertia, whereas the more dense liquid droplets and solid phases particles tend to continue on their downwards trajectory to the bottom section of separator 112.

Disposed within the upper reaction chamber 90 is porous liner 80. In the preferred embodiment, porous liner 80 may be characterized as a hollow cylinder which is concentric about a common vertical axis shared with the pressure vessel 2. Near its top, porous liner 80 may have a curved hemispherical, parabolic or other shape transition piece 83 which forms a controlled transition between the lower section of the porous liner 80 and the bottom end of waste/fuel injection nozzle 39. As stated elsewhere, the geometric shape of porous liner 80 alternatively may be a hollow truncated cone or frustrum, or even a hollow parallelepiped, or other configuration without jeopardizing the utility of the invention. Also, the shape of porous liner 80 may advantageously have a compound shape, i.e., a frustrum of a cone in serial coaxial connection with a cylinder, with collinear axes, or even a sphere, in order to accommodate particular applications or reaction criteria.

Figure 7:
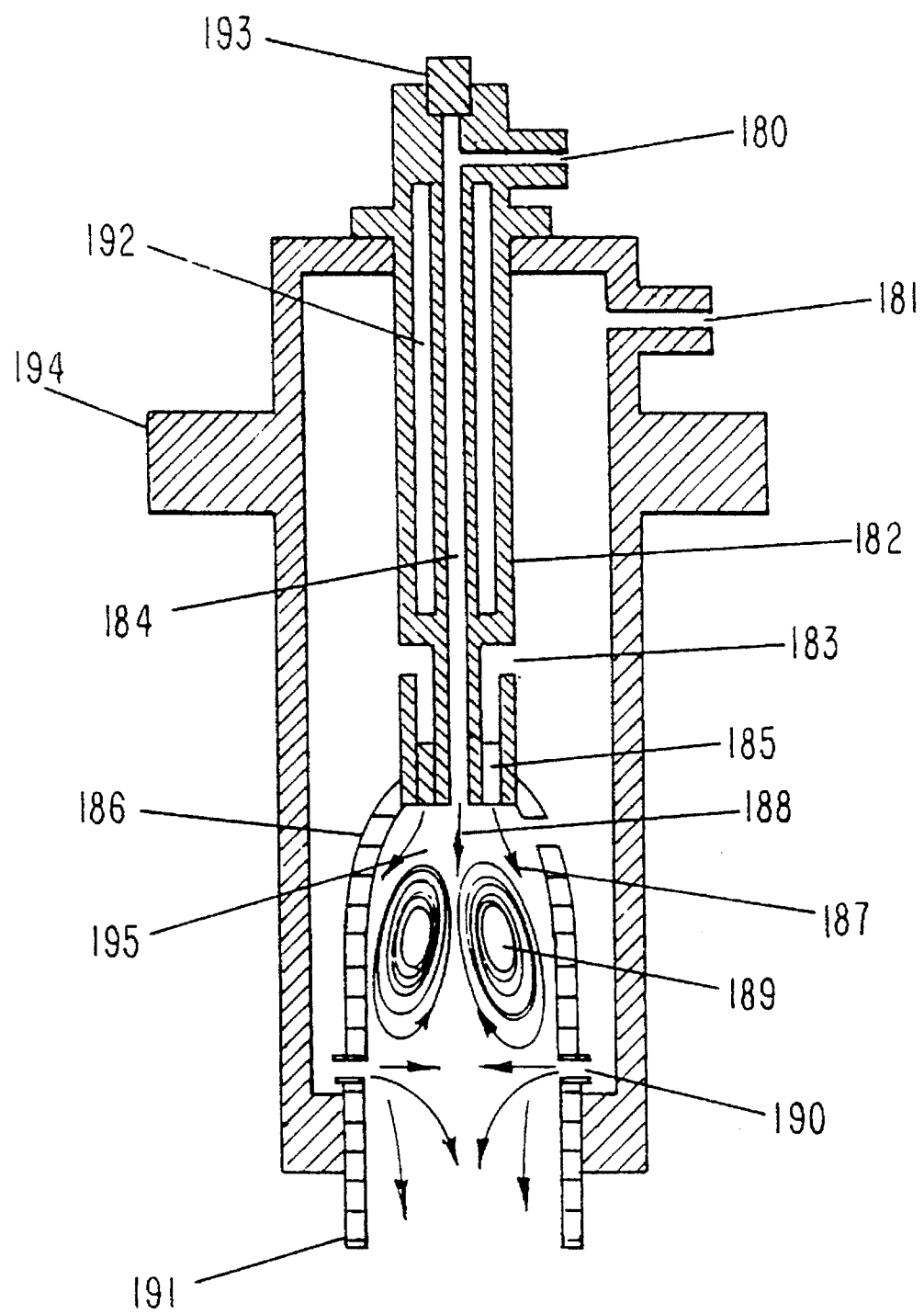
FIG. 7 is a side sectional view of an embodiment of a waste/fuel nozzle assembly for a pressure vessel element.

Attention is now directed to FIG. 6 and 7. In this embodiment, waste inlet nozzle 39 is an assembly of a variety of subcomponents providing means for both injection and turbulent mixing of waste/fuel and oxidizer/carrier mixture prior to entering the hollow interior of porous liner 80. Waste/fuel is injected via waste/fuel line 40 into nozzle insert 182 via waste/fuel inlet port 180. For waste/fuels having a tendency to form varnish or coke which could plug the flow passages in nozzle insert 182, then nozzle insert 182 should incorporate cooling passages 192 to maintain the temperature of the waste/fuel below that at which varnish or coke forms, which for many compounds is approximately 200 degrees C. The waste/fuel is subsequently injected into precombustion chamber 186 forming a waste/fuel spray cone 188. Oxidizer/carrier mixture from line 163 enters the interior of the waste/fuel nozzle assembly 39, via oxidizer/carrier inlet port 181. A portion of the oxidizer/carrier mixture enters the nozzle insert 182 via a set of radial or tangential metering orifices sized to provide the correct amount of flow for this purpose. This metered flow then passes through a set of axial swirl vanes 185 which impart a swirling motion to the flow of oxidizer/carrier mixture, which in turn produces a swirling vortex 187 of oxidizer/carrier mixture within precombustion chamber 186. A set of radial metering orifices 190 located around the circumference of precombustion chamber 186 are sized to produce radial jets of oxidizer/carrier mixture to fluidically interact with swirling vortex 187. The result of the interaction of these flows produces a quasi-toroidal recirculation zone 189 within the precombustion chamber 186. A stationary self-piloting ignition zone 195 is thereby produced at the confluence of the waste/fuel spray cone 188 and the quasi-toroidal recirculation zone 189. The partially-reacted reaction products exit the bottom end 191 of the precombustion chamber 186 and enters the hollow interior of the porous liner 80 where the reaction proceeds to the desired degree of completion. Peak local temperatures within the precombustion chamber may exceed 1,000 degrees C. A variety of nozzle and precombustion chamber design configurations similar to that described above are known in the art and may be used without jeopardizing the utility of the present invention. In this embodiment, various features have been provided to improve the reliability of the system. A removable cover 193 is provided at the top of the waste/fuel nozzle insert 182 to allow access for periodic mechanical cleaning of the waste/fuel passage 184. Both the waste/fuel nozzle insert 182 and the precombustion chamber 186 are removable via the top cover of the waste/fuel nozzle assembly 39 without disassembly of pressure vessel 2. The waste/fuel nozzle insert 182 may be made from a variety of high-temperature alloys, such as those commonly used in gas turbine fuel nozzle assemblies, as known in the art. The bottom end of the waste/fuel nozzle insert 182 may be coated with thermal barrier coatings as known in the art to prevent heat build-up and coking. The precombustion chamber 186 may be made from high-temperature alloys such as those commonly used in gas turbine combustion systems and may likewise be coated with thermal barrier coatings. The precombustion chamber 186 may also be made from ceramic materials such as alumina, yttria-stabilized zirconia, silicon carbide, and ceramic composites such as silicon carbide strengthened alumina. Any material resistant to high temperature oxidation attack in this application may be used in these components without jeopardizing the utility of the invention. For waste/fuels containing halogen species, the material of the precombustion chamber 186 and thermal barrier coating must be resistant to oxidation attack with these species present. As the environment within the precombustion chamber 186 is potentially highly corrosive in such instances, the present invention provides for easy removal, inspection and replacement of these components.

With specific reference to FIG. 5, it is noted that porous liner 80 includes access orifice 81 which is in sealed, fluid connection with waste inlet nozzle 39, so that waste/fuel and oxidizer/carrier mixture may be injected into the hollow interior of liner 80. The entire volume of space mostly enclosed within liner 80 and into which the partially-reacted reaction products flow is the reaction zone 100. The volume of the reaction zone 100 is sized to provide adequate residence time for the reaction to attain the desired degree of completion or destruction and removal efficiency "DRE".

For a bulk average temperature of 550 degrees C. in the reaction zone 100, the required residence time for pre-mixed reactants to achieve a DRE of 99.99 percent would be on the order of 10 seconds. For many compounds, the required residence time is reduced by one half for each 10 degrees C. increase in bulk average reaction temperature above 550 degrees C. Maximum bulk average temperatures in excess of 750 degrees C. are possible with the present invention. The space enclosed between porous liner 80 and pressure vessel 2 is the annulus zone 102. As seen in FIG. 4, the bottom of liner 80 is sealably attached to lower ring wall 84. Thus, reaction zone 100 is separated from the remainder of the upper reaction chamber 90 by porous liner 80.

Throughout the precombustion chamber 186 and reaction zone 100 in the present invention, the principle reaction mechanism is analogous to a turbulent diffusion flame as known in the art, where local reaction rates are limited by the rate that previously un-mixed reactants can be brought together by turbulent mixing and mass diffusion. At temperatures encountered in the precombustion chamber 186 and reaction zone 100, turbulent mixing and diffusion rates are usually slower than chemical kinetic rates and less sensitive to changes in temperature, and thereby minimizes the risk of thermal explosion and detonation that exists in some reacting systems where reactants are pre-mixed before initiating the reaction.

Since the waste/fuel and oxidizer/carrier mixture are injected in waste/fuel nozzle 39 in near stoichiometric proportion, the flow of oxidizer/carrier mixture through the walls of porous liner 80 will for the most part be non-reacting with the contents of reaction zone 100. The excess oxidizer/carrier mixture flowing through the porous liner 80 will be distributed in such a way as to produce what is known in the art as a condition of "over-ventilation" within the reaction zone 100. This condition of over-ventilation will help ensure that unreacted reactants will be fully reacted before reaching the vicinity of the inner surfaces of porous liner 80, thereby minimizing the risk of carbon build-up or other undesirable surface reactions at the wall. The flow through the wall of porous liner 80 will therefore serve primarily to minimize the deposition of solids on the liner wall, provide a degree of protection against corrosion and to cool the inner surfaces of the porous liner 80.

It should be noted that competing mass transport mechanisms may be taking place in the vicinity of the inner surfaces of porous liner 80. While there is a component of flow that is radially inward due to the flow coming through the liner wall, there will also be a radially outward flow of corrosive reaction products by mass diffusion due to the concentration gradients thereby established. If the radially inward flow velocity exceeds the radially outward flow velocity, then "active" corrosion protection might occur to some extent at the inner surface of porous liner 80. This characteristic may occasionally be used to beneficial effect. In any event, it is preferable to utilize corrosion-resistant materials for the inner surfaces of porous liner 80.

To resist the effects of high temperature oxidation and corrosion by the reaction by-products in reaction zone 100, it is recommended to construct the inner surfaces of porous liner 80 from suitable materials known in the art, which may include any of the following: Hastelloy(tm) X, Hastelloy(tm) C-276, Hastelloy(tm) C-22, Hastelloy(tm) C-4, Inconel(tm) 686, titanium (Gr.2, Gr.9, Gr. 12), nickel 201, alloy 625, alloy 230, alloy 214, alloy G-30, platinum/rhodium alloy, gold, high-purity alumina and its composites, silicon carbide, and yttria-stabilized zirconia and other materials determined to be suitable for the environment within reaction zone 100. In the absence of an accurate and dependable compositional analysis of the waste/fuel and reaction by-products, it is impossible to recommend any particular material with certainty as the presence of even trace quantities of some substances may have a significant effect on material suitability.

Figure 8A:
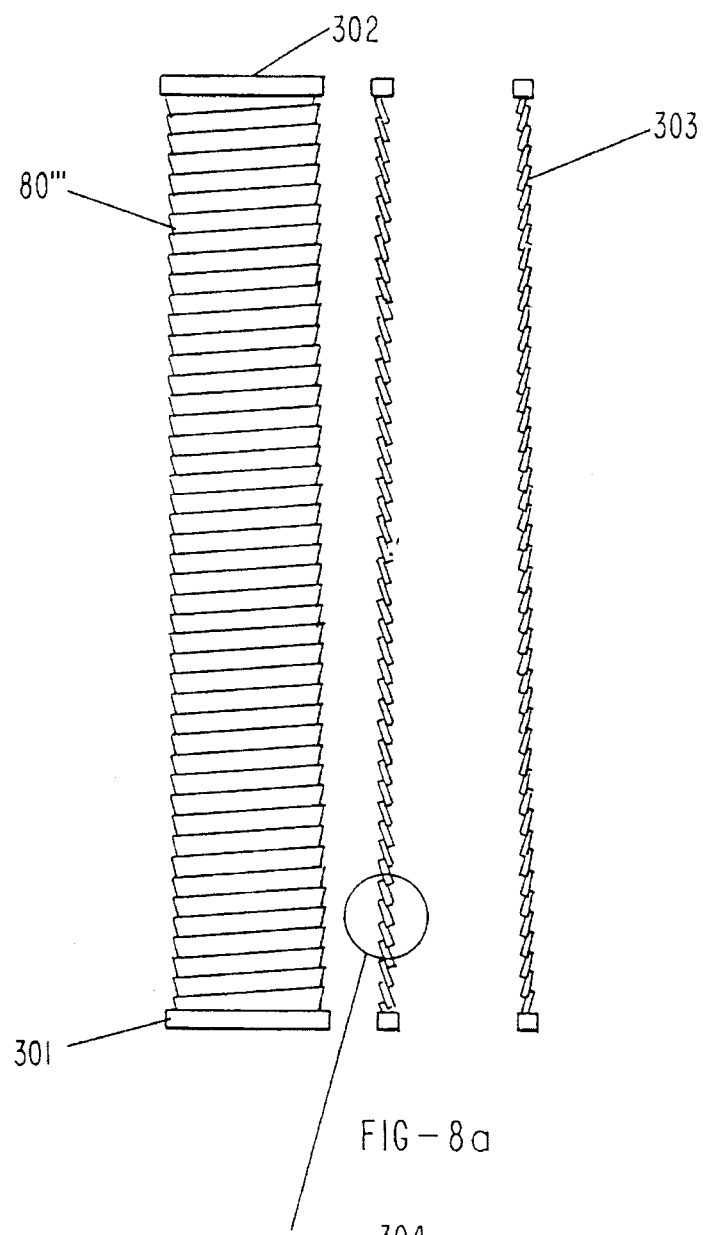
FIG. 8 is a schematic diagram of an embodiment of a porous liner.
Figure 8B:
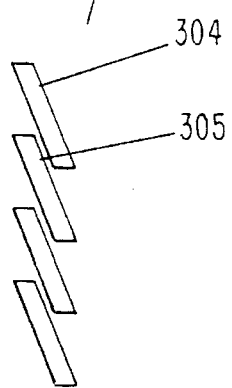

Refer now to FIGS. 5, 8, 9a, and 9b. As mentioned elsewhere, porous liner 80 may be composed of permeable ceramic, as well as perforated ceramic, perforated or drilled metal plate. In fact, porous liner 80 may be made from any sealably attached combination of subcomponents manufactured by methods described herein without jeopardizing the utility of the invention, such as those given below for porous liners 80', 80", and 80'''. All other porous liner type components including transition piece 83, exhaust funnel 108 may likewise be constructed via these methods without jeopardizing the utility of the present invention. FIG. 8 illustrates a method of building a heat exchanger into the wall of the porous liner 80''' which may be used for recovering heat from reaction zone 100 for use external to the process, or for regenerative heating of any of the reactant streams prior to use in the reactor. The wall of porous liner 80 is made from box section tubing which has been wrapped and bonded into a continuous spiral, with header boxes 301 and 302 located at opposite ends. In most applications the fluid to be heated would be injected into header box 301 and emerge heated via header box 302, thereby flowing in counterflow with the reaction by-products within reaction zone 100. Sectional view 303 helps illustrate this point. Flow passages 305 are drilled along the seam where the successive turns of box section tubing 304 overlap each other. Regenerative heating of the recycle water in this method allows operation of the reactor at higher waste/fuel concentrations than otherwise possible due to more effective cooling of the porous liner 80 owing to the lower mean temperature of the cooling medium. Should such a heat exchanger/porous liner 80 be used for heat recovery serving external purposes, then there is a possibility that the operating pressure of the external process may be significantly different from the pressure with pressure vessel 22, requiring greater wall thickness box section tubing to withstand the higher pressure differential. When recovering heat, say for an external steam power generation process, a higher maximum steam cycle temperature (hence efficiency) may be possible by extracting heat in the above manner from reaction zone 100.

FIG. 9a illustrates another manufacturing method for porous liner 80' whereby the liner consists of a welded series of "splash rings" 203, as known in the art. Sectional view 201 helps illustrate this point. Excess oxidizer/carrier mixture flows from annulus 102 through flow orifices 202 and impinge against splash rings 203. The flow is thereby dispersed into a quasi-uniform film along the inboard surfaces of the downstream splash rings 203 providing a protective boundary layer. The impingement on the outboard surfaces of the splash rings provides cooling of the splash rings.

FIG. 9b illustrates a manufacturing method for porous liner 80" whereby a metallic or ceramic hollow cylinder has a closely spaced pattern of precision-manufactured (nominally 0.020 inch diameter) flow passages 207 manufactured in the cylinder wall 206 at an angle on the order of 20 degrees to the inner surface as known in the art. Sectional view 205 illustrates this point. Excess oxidizer/carrier mixture flows from annulus 102 through flow orifices 207 into the reaction zone 100. In this construction method, the total open flow area is on the order of only a few percent of total cylinder surface area, yet effective cooling of the cylinder wall is achieved via convective heat transfer within these flow passages 207. A protective cooling boundary layer also formed along the inner surface of the liner. Flow passages 207 may be manufactured at any angle to the surface including tangentially around the circumference of the liner.

A variety of other methods are known in the art for constructing a porous liner protected by a film of fluid flowing through and over the inner and outer surfaces of the liner, the use of which will not jeopardize the utility of the present invention. In all these methods the distribution of flow over the surface of porous liner 80 may be either uniform or non-uniform as may be required by design. Flow at any location along the surface of the porous liner 80 may be controlled by adjusting the hole pattern density, passage cross sectional area, and other characteristics of the flow passages.

With specific reference to FIG. 5, below reaction chamber 90, but within pressure vessel 2, is cooling chamber 92. Within cooling chamber 92 is exhaust funnel 108, a hollow inverted frustrum, typically of a cone, whose base is sealably attached throughout its circumference, to the bottom edge of porous liner 80. As seen in FIG. 5, the juncture of liner 80 with exhaust funnel 108 is at or near the juncture of the former with the lower ring wall 84. Exhaust funnel 108 is composed of the same or similar methods as described above for porous liner 80. Exhaust funnel 108 functions to collect and direct reaction products exiting the reaction zone 100 via the reaction products exhaust 50 (the large orifice in the lower ring wall 84). Reaction by-products are cooled by passage through exhaust funnel 108 where they are mixed with cooled recirculated brine, which induces liquids and solids to precipitate out of the exhaust solution. Because exhaust funnel 108 is fashioned from a porous, permeable material described above, similar to porous liner 80, 80', 80", 80''', the exhaust funnel benefits from similar advantages. The higher concentration of cooled effluent at the inner surface of funnel 108, and the heat exchange between the cooled effluent and the wall of funnel 108, promotes funnel longevity. An outlet at the bottom of exhaust funnel 108 is sealably attached to separator ring wall 154 which separates cooling chamber 92 from separator 112. Partially cooled reaction by-products enter the separator via the orifice in the separator ring wall 154. In this embodiment, the reaction by-products are cooled to just below the water dewpoint temperature of these byproducts at the corresponding reactor operating pressure, thereby resulting in the production of separate liquid and vapor phases, even at pressures above the critical pressure of water (221 bar), due to the high concentration of non-condensable by-product gases. Should base neutralization be performed via the exhaust funnel 108, then any acid gases in the reaction byproducts will be converted to a salt, which may be in solution with the liquid phase forming a brine which will settle to the bottom of separator 112. The vapor phase is in saturated thermal equilibrium with the liquid brine phase and primarily consists of water vapor plus non-condensable gases including excess oxidizer, nitrogen (if air is used as oxidizer), and carbon dioxide. An advantage of this embodiment is that all water required by the process for mass balance can be recovered directly from the vapor phase leaving the separator 112 via vapor outlet port 167. However, for this to be accomplished, it is first necessary for the mass of water vapor carried away in the vapor phase to be at least equal to the water requirements of the process. Typically, this requires operating the separator 112 at a temperature close to and slightly below the water dewpoint temperature of the reaction byproducts, in which case most of the water leaves the separator in the form of vapor along with the non-condensable by-product gases. For a waste:water ratio of 1:10 at a reactor operating pressure of 250 bar, we have estimated the required separator temperature for process mass balance to be between 340 degrees C. and 360 degrees C. This temperature should rise as a function of salt concentration in the brine. As the operating pressure is decreased, there will be a corresponding decrease in both the water dewpoint temperature and maximum required separator temperature.

Water vapor and non-condensable gases exit separator 112 via vapor outlet port 167 and pass through gas-liquid separator 160 to remove residual quantities of entrained liquid. Separator 160 may be a hydrocyclone, inertial, or impingement/coalescing separator as known in the art. The scrubbed vapor is then directed to open heat exchanger 159 via hot vapor line 176. Any liquid removed from the vapor by separator 160 is drained to the brine recirculation loop via line 177. Water to be recovered for the process is condensed from the hot gaseous mixture in line 176 by cooling in open heat exchanger 159. The resulting two phase stream of liquid water, non-condensable gases, and excess water vapor exits open heat exchanger 159 and flows to condensate separator vessel 130 of a type known in the art via line 116. The non-condensable gases and excess water vapor exit the system via exhaust gas outlet port 119 and control valve 175. The condensed water is recycled back to the process via line 132 from which a portion is diverted and further cooled in closed heat exchanger 157 for recirculation back to open heat exchanger 159 for cooling purposes via circulation pump 158. The remainder of the condensed water is directed to the inlet of circulation pump 168 for recirculation through the process. Recirculated water may be treated by a variety of methods known in the art for controlling scale formation and corrosion within the process, similar to the treatment of boiler water. To help control the accumulation of solids within the water recirculation system, water is periodically removed from the system at evaporator/heater 152 by blowdown as practiced in steam boiler equipment known in the art.

As the brine is the primary liquid effluent from the process, the temperature in the separator 112 may be increased to produce a brine of increased salt concentration with corresponding decreased volume. Excess process water (hydrogen-formed and waste/fuel-bound water) may be removed from the separator 112 as brine via brine outlet port 111 and/or water vapor via vapor outlet port 167. Brine plus any insoluble solids are continuously flushed and removed from the bottom of the separator 112 via brine outlet port 111.

Combined reference is now made to FIGS. 5 and 6. Brine leaving separator 112 via brine outlet port 111 is cooled in closed heat exchanger 155 and entrained insoluble solids removed from the brine stream by solids separator 173, which may be of the hydrocyclone or any type known in the art. Entrained solids are flushed from the solids separator 173 by the flow of excess process water and removed from the process via liquid/solid effluent line 113 and control valve 174. The clean brine stream downstream of solids separator 173 is circulated by pump 156 to coolant line 120 for injection into cooling chamber 92. Cooling of the brine generally results in a less-saturated salt concentration in the brine, thereby minimizing the risk of salt precipitation and plugging in cooling chamber 92 and exhaust funnel 108. This cooled brine may be dosed with caustics, such as sodium hydroxide or ammonium hydroxide for base neutralization of any acid gases in the reaction by-products. Calcium carbonate may also be added to the cooled brine for lime-gypsum scrubbing of sulfur dioxide from the reaction by-products. Cooled effluent passing inward through exhaust funnel 108 may also be used to flush the interior of exhaust funnel 108 and wash accumulated precipitates therefrom in a fashion analogous to the self-flushing character of porous liner 80. This cleansing function is especially desirable in the case of precipitates that are soluble in the cooled brine but insoluble in the hotter reaction by-products. Process flowrates through circulation pumps 156, 158 and 168 may be accomplished by a variety of means known in the art including discharge throttling and speed variation of the pump driver. The rate of cooling in quench cooler 159 may be controlled to maintain constant level in condensate vessel 130.

It should be noted that useful heat may be recovered from the brine cooler 155 and condensate cooler 157 for use elsewhere in the process where heating is required, such as by heaters 152, 151, and 56. Excess heat recovered from the process coolers may be utilized to raise steam for power generation or otherwise used for heating purposes external to the process. It should also be noted that multiple sets of reactor internals described herein may installed in single pressure vessel in parallel configuration.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, and of the corresponding application are hereby incorporated by reference.

What is claimed is:

1. A supercritical reactor apparatus comprising:

a pressure vessel capable of operating at a temperature in excess of a supercritical temperature of water;

a reaction zone enclosed within said pressure vessel;

a source of at least one fuel;

precombustion chamber means for introducing said fuel into said reaction zone;

a supply of at least one reactant;

means for pumping or compressing said reactant;

means for heating said reactant to or above said supercritical temperature;

means for injecting the heated and compressed reactant into said pressure vessel;

means for mixing a portion of said reactant with said fuel in said precombustion chamber means, thereby inducing a reaction at or above said supercritical temperature in said precombustion chamber means with said fuel;

a permeable liner comprising material capable of being permeable to a remaining portion of said reactant at a temperature in excess of the supercritical temperature of water, said liner disposed between said means for injecting and said reaction zone, and through which said liner said remaining portion of said reactant is dispersed into said reaction zone thereby inducing a reaction at or above said supercritical temperature in said reaction zone with said fuel; and an exhaust, through which by-products of the reaction exit from said reaction zone.

2. The apparatus of claim 1 wherein said precombustion chamber means comprises means for operating at approximately a stoichiometric ratio between reactants.

3. The apparatus of claim 1 additionally comprising separator means for separating liquid and solid by-products from gaseous by-products, said separator means located within a pressure boundary of said pressure vessel.

4. The apparatus of claim 1 wherein said permeable liner comprises a wall comprising a heat exchanger means.

5. The apparatus of claim 1 wherein said permeable liner comprises a member selected from the group consisting of permeable ceramics, precision-drilled ceramics, perforated ceramics, precision-drilled metal plate, perforated metal place, box section tubing, and splash rings.

6. The apparatus of claim 5 wherein said permeable liner comprises precision-manufactured flow passages.

7. The apparatus of claim 6 wherein said flow passages comprise a diameter of approximately 0.020 inches and are oriented at an angle of approximately 20 degrees to an inner surface of said permeable liner.

8. The apparatus of claim 1 additionally comprising separator means for separating liquid and solid by-products from gaseous by-products, means for reclaiming water from said separated gaseous by-products, and means for recirculating said reclaimed water to cool said supercritical reactor.

9. The apparatus of claim 1 additionally comprising separator means for separating liquid from solid by-products, means for reclaiming brine from said separated liquid by-products, means for cooling said brine, and means for providing said cooled brine to cool exhaust by-products.

10. The apparatus of claim 1 wherein said fuel is selected from the group consisting of industrial waste waters containing toxic, hazardous, and non-hazardous organic and inorganic wastes; organic sludges and waste waters from municipal sewage treatment plants; oils, solvents, cutting fluids, coolants, hydraulic fluids; organic sulfur compounds; organic nitrogen compounds including rocket propellants and high-explosives; military smokes, dyes, and pyrotechnic materials; radioactive mixed wastes; ammonia; nitrates; nitrites; biomass-derived substances, including raw biomass slurry and algae; and processed fuels including ethanol, methanol and oils.

11. The apparatus of claim 1 wherein said pressure vessel is capable of operating at a temperature greater than 1,000 degrees C.

12. The apparatus of claim 1 wherein said pressure vessel is capable of operating at a pressure lower than a supercritical pressure of water of approximately 221 bar to a pressure as low as approximately 25 bar.

13. The apparatus of claim 1 additionally comprising means for preheating said fuel by mixing with superheated water.

14. A method of reacting substances under supercritical conditions comprising the steps of:

(a) providing a pressure vessel capable of operating at a temperature in excess of a supercritical temperature of water;

(b) disposing a reaction zone within the pressure vessel;

(c) placing between the pressure vessel and the reaction zone a permeable liner capable of being permeable to the reactant at a temperature in excess of the supercritical temperature of water;

(d) introducing at least one fuel into a precombustion chamber;

(e) pumping or compressing at least one reactant;

(f) heating the reactant to at least the supercritical temperature;

(g) mixing a portion of the reactant with the fuel in the precombustion chamber thereby inducing a reaction at or above the critical temperature in the chamber with the fuel;

(g) injecting a remaining portion of the reactant into the pressure vessel;

(h) forcing the remaining portion of the reactant through the permeable liner, thereby dispersing the heated reactant within the reaction zone to induce a reaction with the fuel and reactant from the precombustion chamber; and (i) exhausting the reaction by-products from the reaction zone.

15. A supercritical reactor apparatus comprising:

a pressure vessel capable of operations at a temperature in excess of a supercritical temperature of water;

a reaction zone enclosed within said pressure vessel;

a source of at least one fuel;

a supply of at least one reactant;

means for pumping or compressing said reactant;

means for heating said reactant to or above said supercritical temperature;

means for injecting the heated and compressed reactant into said pressure vessel;

a permable liner comprising material capable of being permeable to said reactant temperature in excess of the supercritical temperatures of water, said liner disposed between said means for injecting and said reaction zone, and through which said liner said reactant is dispersed into said reaction zone thereby inducing a reaction at or above said supercritical temperature in said reaction zone with said fuel;

an exhaust, through which by-products of the reaction exit from said reaction zone;

separator means for separating liquid and solid by-products from gaseous by-products;

means for reclaiming water from said separated gaseous by-products; and means for recirculating said reclaimed water to cool said supercritical reactor.

16. A supercritical reactor apparatus comprising:

a pressure vessel capable of operating at a temperature in excess of a supercritical temperature of water;

a reaction zone enclosed wither said pressure vessel;

a source of at least one fuel;

a supply of at least one reactant;

means for pumping or compressing said reactant;

means for heating said reactant to or above said supercritical temperature;

means for injecting the heated and compressed reactant into said pressure vessel;

a permeable liner comprising material capable of being permeable to said reactant at a temperature in excess of the supercritical temperature of water, said liner disposed between said means for injecting and said reaction zone, and through which said liner said reactant is dispersed into said reaction zone thereby inducing a reaction at or above said supercritical temperature in said reaction zone with said fuel;

an exhaust, through which by-products of the reaction exit from said reaction zone;

separator means for separating liquid from solid by-products;

means for reclaiming brine from said separated liquid by-products;

means for cooling said brine; and means for providing said cooled brine to cool said exhaust by-products.

* * * * *